(12) United States Patent
Kageyama et al.

(10) Patent No.: US 12,539,474 B2
(45) Date of Patent: Feb. 3, 2026

(54) OIL FILTER DEVICE

(71) Applicant: Komatsu Ltd., Tokyo (JP)

(72) Inventors: Masato Kageyama, Tokyo (JP); Shouta Seto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 1 day.

(21) Appl. No.: 18/729,692

(22) PCT Filed: Mar. 3, 2023

(86) PCT No.: PCT/JP2023/007961
§ 371 (c)(1),
(2) Date: Jan. 3, 2025

(87) PCT Pub. No.: WO2023/176497
PCT Pub. Date: Sep. 21, 2023

(65) Prior Publication Data
US 2025/0339796 A1    Nov. 6, 2025

(30) Foreign Application Priority Data
Mar. 15, 2022   (JP) .................. 2022-040522

(51) Int. Cl.
B01D 35/147   (2006.01)
F15B 21/041   (2019.01)

(52) U.S. Cl.
CPC .......... *B01D 35/147* (2013.01); *F15B 21/041* (2013.01); *F15B 2211/615* (2013.01); *F15B 2211/634* (2013.01)

(58) Field of Classification Search
None
See application file for complete search history.

(56) References Cited

U.S. PATENT DOCUMENTS

| 2008/0296288 | A1 | 12/2008 | Girondi | |
| 2018/0056223 | A1* | 3/2018 | Meid | B01D 35/143 |
| 2018/0104629 | A1 | 4/2018 | Taku et al. | |
| 2018/0361283 | A1* | 12/2018 | Yokoyama | E02F 9/2025 |

FOREIGN PATENT DOCUMENTS

| DE | 102020200388 A1 * | 7/2021 | F15B 21/041 |
| JP | 2009-519397 A | 5/2009 | |
| JP | 2017-6831 A | 1/2017 | |
| WO | 2017/191852 A1 | 11/2017 | |

* cited by examiner

*Primary Examiner* — Thomas E Lazo
(74) *Attorney, Agent, or Firm* — Troutman Pepper Locke LLP

(57) ABSTRACT

An oil filter includes: a conductive valve body disposed in a passage provided in a space of a filter case; a conductive valve shaft supported by the valve body via an insulator; a conductive valve disc movably supported by the valve shaft and closing the passage by contacting with the valve body; a valve elastic member generating an elastic force to bring the valve disc into contact with the valve body; a conductive movable member, connected to the valve body, contacting with the valve disc in a state where the valve disc contacts with the valve body and separating from the valve disc after the valve disc separates from the valve body; and a controller supplying current to the valve disc via the valve shaft to determine whether the passage is closed based on an energization state across the valve disc and the valve body.

13 Claims, 12 Drawing Sheets

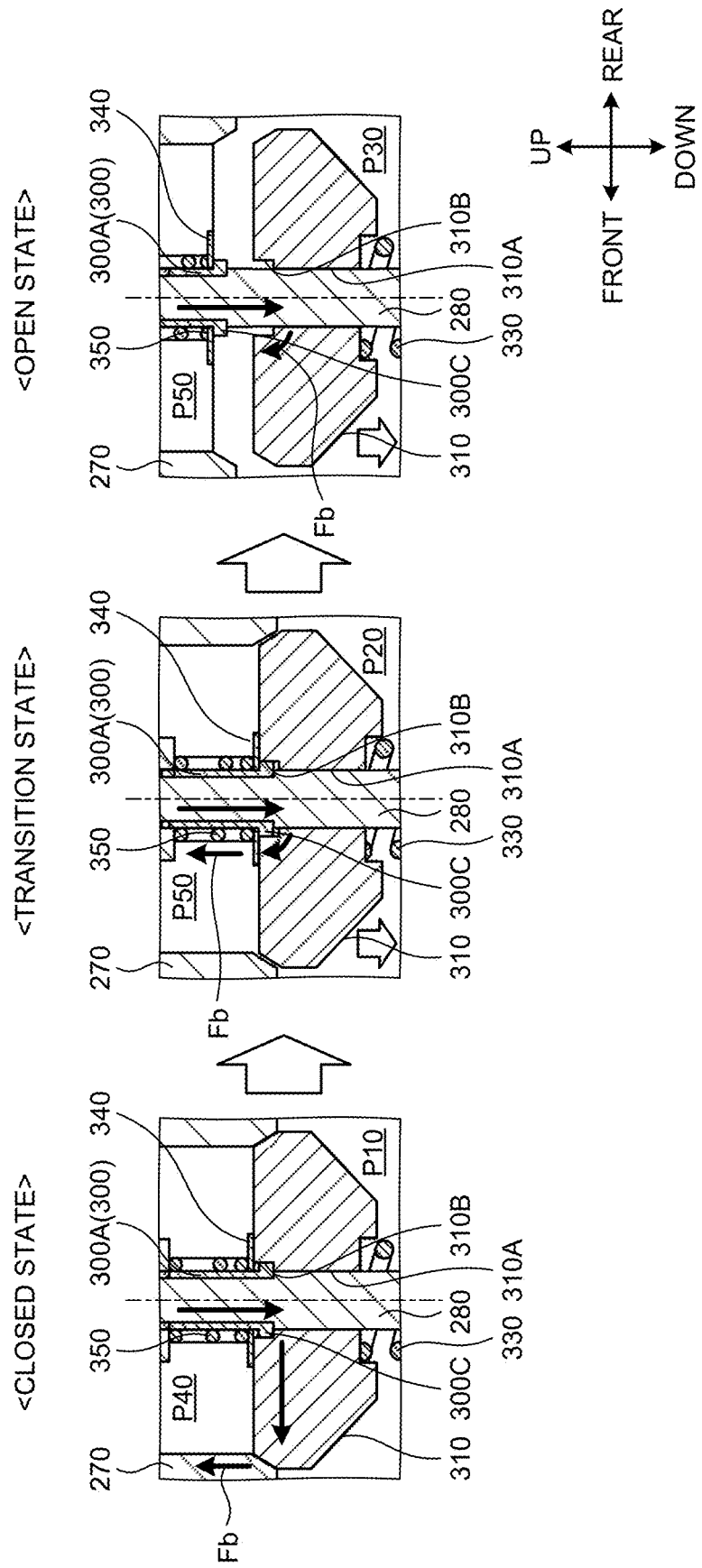

OIL FILTER DEVICE

FIELD

The present disclosure relates to an oil filter device.

BACKGROUND

In a technical field related to an oil filter device, an oil filter device as disclosed in Patent Literature 1 is known. The oil filter device includes a valve that opens and closes a bypass passage.

CITATION LIST

Patent Literature

Patent Literature 1: WO 2017/191852 A

SUMMARY

Technical Problem

An object of the present disclosure is to accurately detect opening and closing of a bypass passage.

Solution to Problem

According to an aspect of the present invention, an oil filter device comprises: a filter case; a filter element disposed in a main passage provided in an internal space of the filter case; a valve body having conductivity and disposed in a bypass passage provided in the internal space; a valve shaft having conductivity and supported by the valve body via a valve insulating member; a valve disc having conductivity and movably supported by the valve shaft and configured to close the bypass passage by coming in contact with the valve body; a valve elastic member that generates an elastic force to bring the valve disc into contact with the valve body; a movable member having conductivity, connected to the valve body, configured to come into contact with the valve disc in a state where the valve disc comes into contact with the valve body and configured to separate from the valve disc after the valve disc separates from the valve body; and a controller that supplies current to the valve disc via the valve shaft to determine whether the bypass passage is closed based on an energization state across the valve disc and the valve body.

Advantageous Effects of Invention

According to the present disclosure, opening and closing of the bypass passage is accurately detected.

BRIEF DESCRIPTION OF DRAWINGS

FIG. 12 is a diagram illustrating operations of the valve disc and a movable member according to the second embodiment.

DESCRIPTION OF EMBODIMENTS

Hereinafter, embodiments according to the present disclosure will be described with reference to the drawings, but the present disclosure is not limited to the embodiments. The constituents described in the embodiments below can be appropriately combined with each other. In some cases, some of the constituents is not utilized.

First Embodiment

A first embodiment will be described.
<Hydraulic System>

Figure 1:
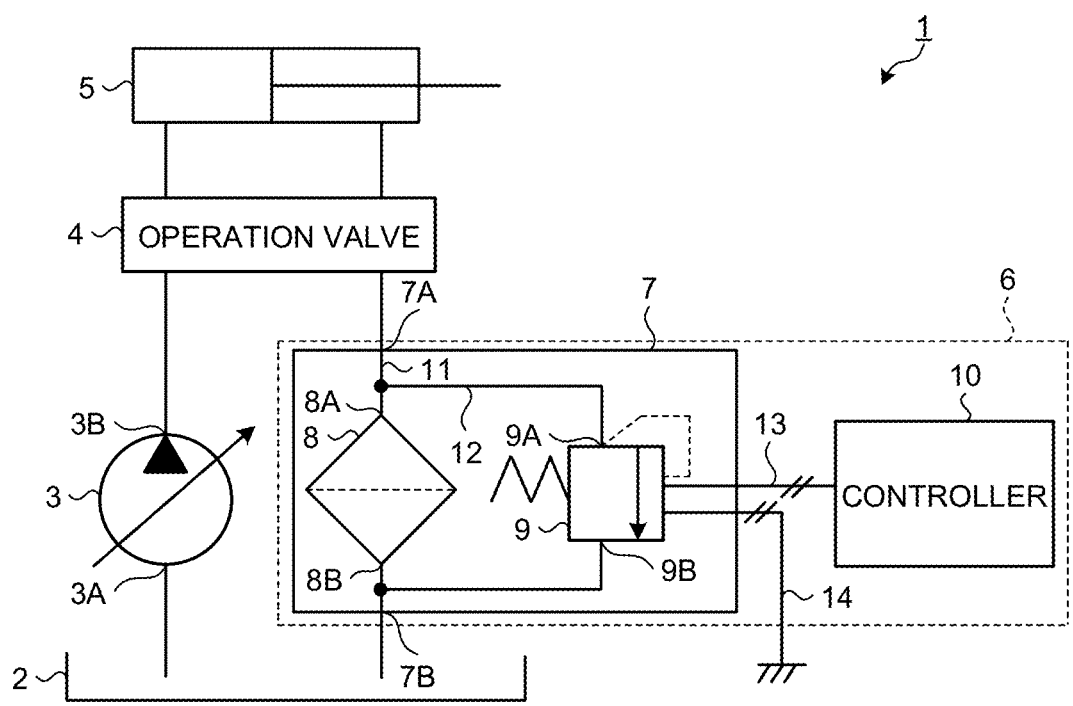
FIG. 1 is a diagram schematically illustrating a hydraulic system according to a first embodiment.

FIG. 1 is a diagram schematically illustrating a hydraulic system 1 according to the present embodiment. The hydraulic system 1 is mounted on a work machine. Examples of the work machine include an excavator, a bulldozer, a wheel loader, and a dump truck.

The hydraulic system 1 includes a hydraulic oil tank 2, a hydraulic pump 3, an operation valve 4, a hydraulic actuator 5, and an oil filter device 6.

The hydraulic oil tank 2 stores hydraulic oil.

The hydraulic pump 3 discharges hydraulic oil. The hydraulic pump 3 includes a suction port 3A and a discharge port 3B. The suction port 3A sucks the hydraulic oil stored in the hydraulic oil tank 2. The discharge port 3B discharges the hydraulic oil sucked from the hydraulic oil tank 2. The hydraulic oil discharged from the discharge port 3B is supplied to the hydraulic actuator 5 via the operation valve 4.

The operation valve 4 controls a flow rate and a direction of hydraulic oil to be supplied to the hydraulic actuator 5.

The hydraulic actuator 5 is actuated by hydraulic oil supplied from the hydraulic pump 3 via the operation valve 4. In the example illustrated in FIG. 1, the hydraulic actuator 5 is a hydraulic cylinder. The direction of the hydraulic oil supplied to the hydraulic cylinder is controlled by the operation valve 4, allowing expansion/contraction of the hydraulic cylinder. The flow rate of the hydraulic oil to be supplied to the hydraulic cylinder is controlled by the operation valve 4, thereby controlling the operation speed of the hydraulic cylinder. The hydraulic actuator 5 may be a hydraulic motor. The hydraulic oil discharged from the hydraulic actuator 5 is returned to the hydraulic oil tank 2 via the operation valve 4. The hydraulic oil tank 2 stores the hydraulic oil returned from the hydraulic actuator 5.

The oil filter device 6 collects foreign substances from the hydraulic oil. In the present embodiment, the oil filter device 6 collects foreign substances from the hydraulic oil returned from the hydraulic actuator 5 to the hydraulic oil tank 2 via the operation valve 4.

The oil filter device 6 includes a filter case 7, a filter element 8, a bypass valve 9, and a controller 10.

The filter case 7 has an internal space to accommodate the filter element 8 and the bypass valve 9. The filter case 7 has an inlet 7A of hydraulic oil and an outlet 7B of hydraulic oil. The hydraulic oil from the operation valve 4 flows into the internal space of the filter case 7 via the inlet 7A. The hydraulic oil flowing into the internal space of the filter case 7 flows out from the internal space of the filter case 7 via the outlet 7B. The hydraulic oil flowing out of the outlet 7B is supplied to the hydraulic oil tank 2.

There are provided a main passage 11 and a bypass passage 12 in the internal space of the filter case 7. The bypass passage 12 is provided so as to bypass the main passage 11. The filter element 8 is disposed in the main passage 11. The bypass valve 9 is disposed in the bypass passage 12.

The filter element 8 collects foreign substances from the hydraulic oil flowing through the main passage 11. The filter element 8 includes an inflow portion 8A of hydraulic oil and an outflow portion 8B of hydraulic oil. The hydraulic oil flowing into the filter element 8 via the inflow portion 8A passes through the filter element 8 and then flows out from the outflow portion 8B. The hydraulic oil passes through the filter element 8 to allow a foreign substance contained in the hydraulic oil to be collected by the filter element 8.

An upstream end of the bypass passage 12 is connected to the main passage 11 between the inlet 7A and the inflow portion 8A. A downstream end of the bypass passage is connected to the main passage 11 between the outflow portion 8B and the outlet 7B.

The bypass valve 9 opens and closes the bypass passage 12. The bypass valve 9 has an inflow port 9A of hydraulic oil and an outflow port 9B of hydraulic oil. The inflow port 9A of the bypass valve 9 is connected to the inflow portion 8A of the filter element 8. The outflow port 9B of the bypass valve 9 is connected to the outflow portion 8B of the filter element 8. The bypass valve 9 opens and closes the bypass passage 12 based on a differential pressure indicating a difference between the pressure of the inflow portion 8A and the pressure of the outflow portion 8B of the filter element 8. The bypass valve 9 closes the bypass passage 12 when the differential pressure is a specified value or less. The bypass valve 9 opens the bypass passage 12 when the differential pressure exceeds a specified value. The specified value is a value predetermined for the differential pressure.

When the bypass passage 12 is closed, the hydraulic oil flowing into the internal space of the filter case 7 from the inlet 7A passes through the main passage 11 including the filter element 8, then flows out from the outlet 7B to be supplied to the hydraulic oil tank 2.

When the bypass passage 12 is opened, at least a part of the hydraulic oil flowing into the internal space of the filter case 7 from the inlet 7A passes through the bypass passage 12 including the bypass valve 9, then flows out from the outlet 7B to be supplied to the hydraulic oil tank 2.

The foreign substance collected by the filter element 8 might clog the filter element 8. Clogging of the filter element 8 would increase the differential pressure between the inflow portion 8A and the outflow portion 8B. When the differential pressure between the inflow portion 8A and the outflow portion 8B increases, the bypass valve 9 operates to open the bypass passage 12. Opening the bypass passage 12 suppresses an excessive increase in the differential pressure between the inflow portion 8A and the outflow portion 8B. Suppressing an excessive increase of the differential pressure between the inflow portion 8A and the outflow portion 8B will prevent breakage of the filter element 8.

The controller 10 supplies current to the bypass valve 9 to determine whether the bypass passage 12 is closed based on the energization state of the bypass valve 9.

The controller 10 is disposed in an external space of the filter case 7. The controller 10 supplies current to the bypass valve 9 from the outside of the filter case 7.

The bypass valve 9 is connected to the controller 10 via an input line 13. The bypass valve 9 is grounded via an output line 14. The controller 10 supplies current to the bypass valve 9 via the input line 13. A part of the input line 13 is disposed in an external space of the filter case 7. A part of the input line 13 is disposed in the internal space of the filter case 7. A part of the output line 14 is disposed in the internal space of the filter case 7. A part of the output line 14 is disposed in an external space of the filter case 7.

When the bypass passage 12 is closed, the current supplied to the bypass valve 9 via the input line 13 flows through the bypass valve 9 and then flows through the output line 14.

When the bypass passage 12 is opened, the current supplied to the bypass valve 9 via the input line 13 is interrupted by the bypass valve 9 and does not flow through the output line 14.

The controller 10 can determine whether the bypass passage 12 is closed based on whether the bypass valve 9 is energized. The electric resistance value of the electric circuit, including the input line 13, the bypass valve 9, and the output line 14, changes between a state where the current flows through the bypass valve 9 and a state where the current is interrupted at the bypass valve 9. The controller 10 can determine whether the bypass passage 12 is closed based on the electric resistance value.

When having determined that the bypass passage 12 is closed, the controller 10 can estimate that the state of the filter element 8 is good. When having determined that the bypass passage 12 is opened, the controller 10 can estimate that the state of the filter element 8 is not good. The state where the filter element 8 is not good includes a state where the filter element 8 is clogged.

<Oil Filter Device>

Figure 2:
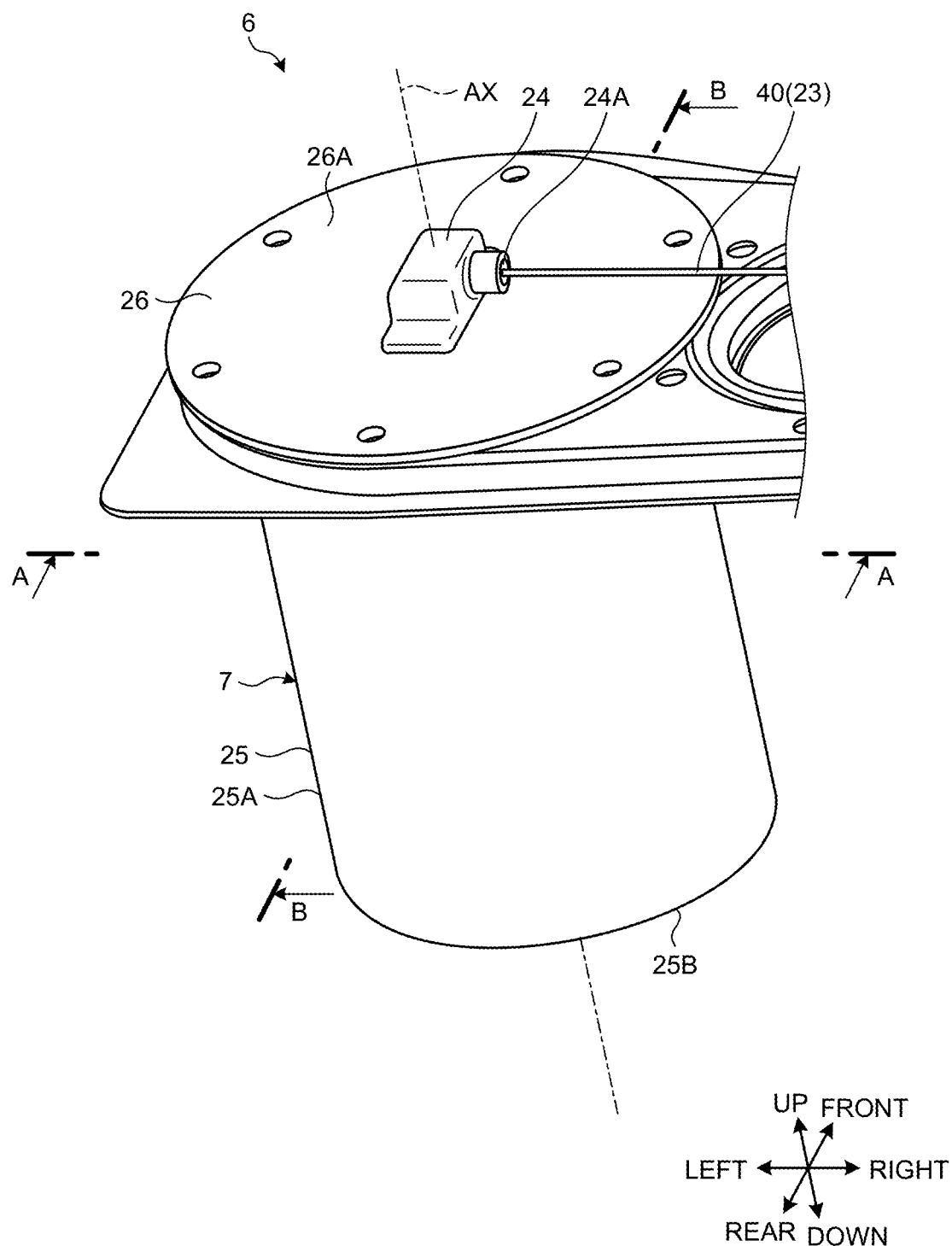
FIG. 2 is a perspective view illustrating the oil filter device according to the first embodiment.
Figure 3:
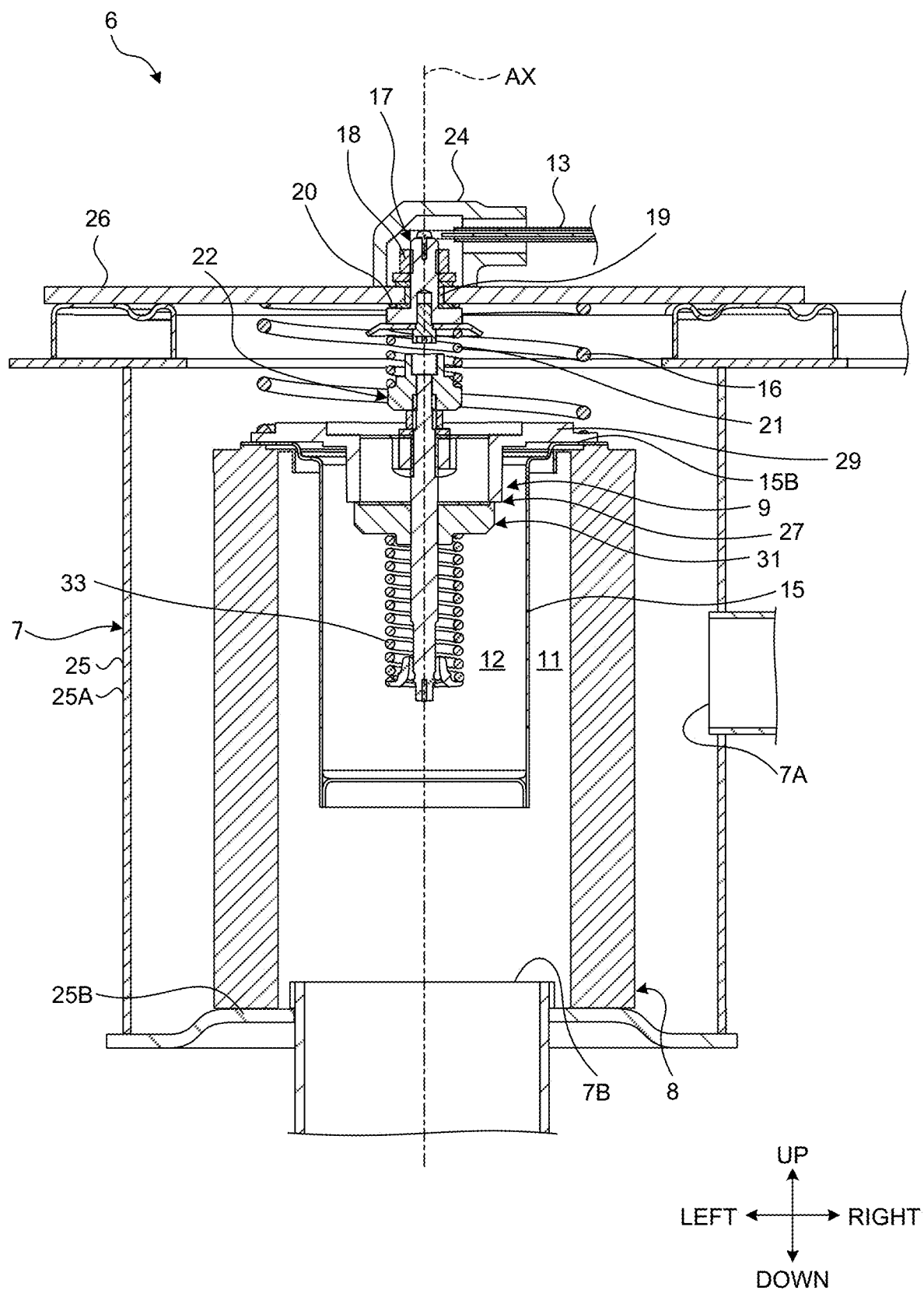
FIG. 3 is a cross-sectional view illustrating the oil filter device according to the first embodiment.
Figure 4:
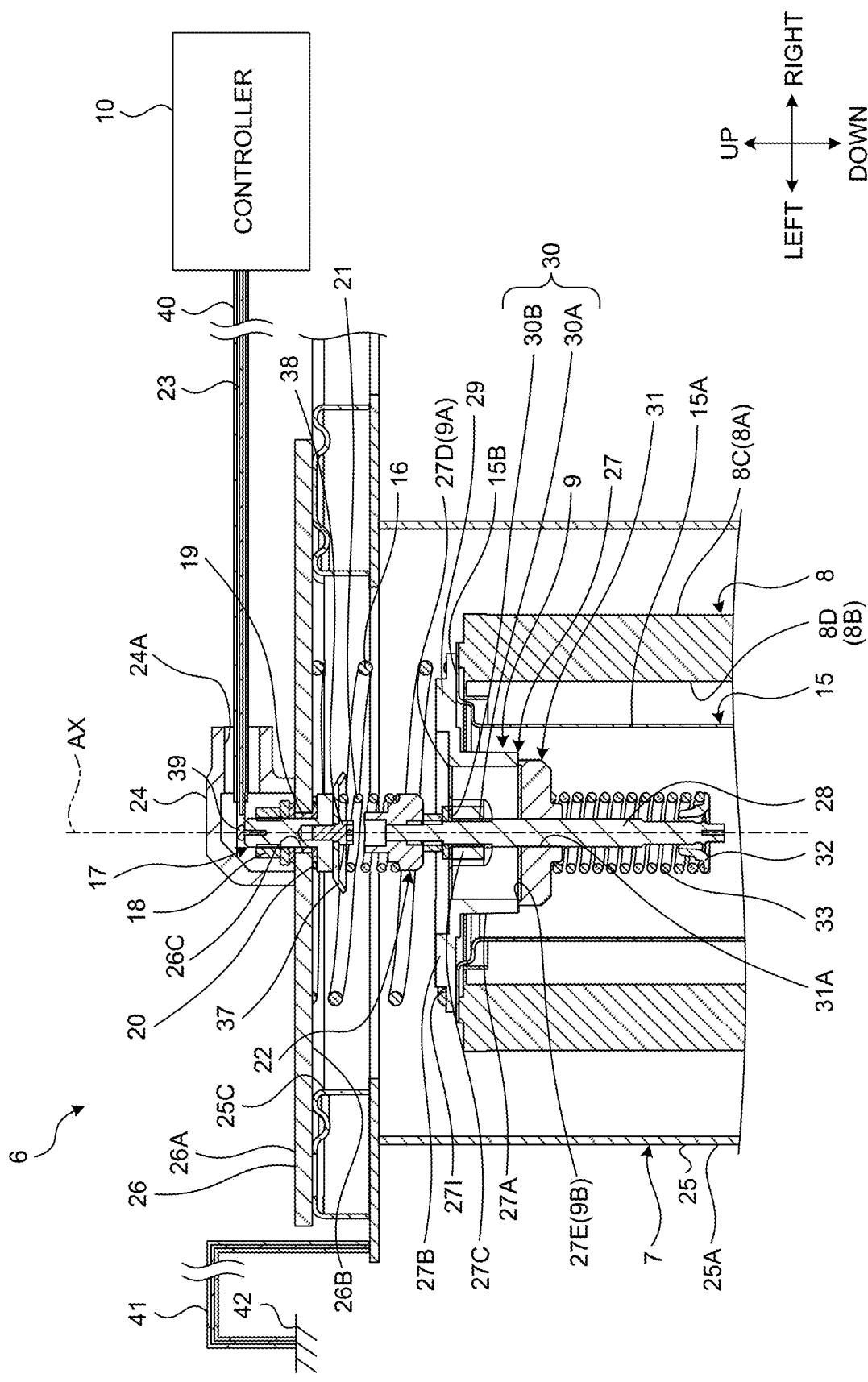
FIG. 4 is a cross-sectional view illustrating a part of the oil filter device according to the first embodiment.
Figure 5:
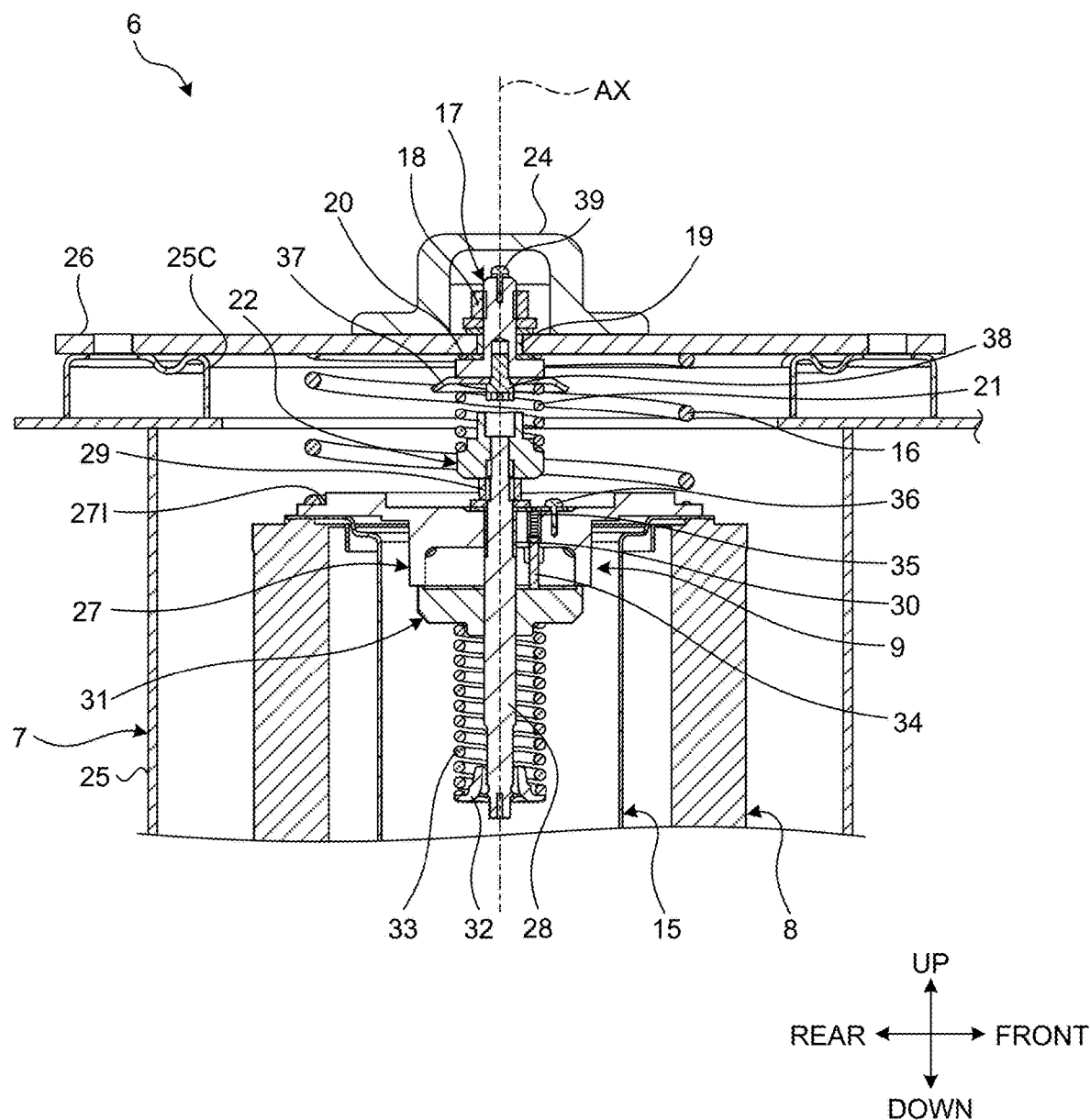
FIG. 5 is a cross-sectional view illustrating a part of the oil filter device according to the first embodiment.
Figure 6:
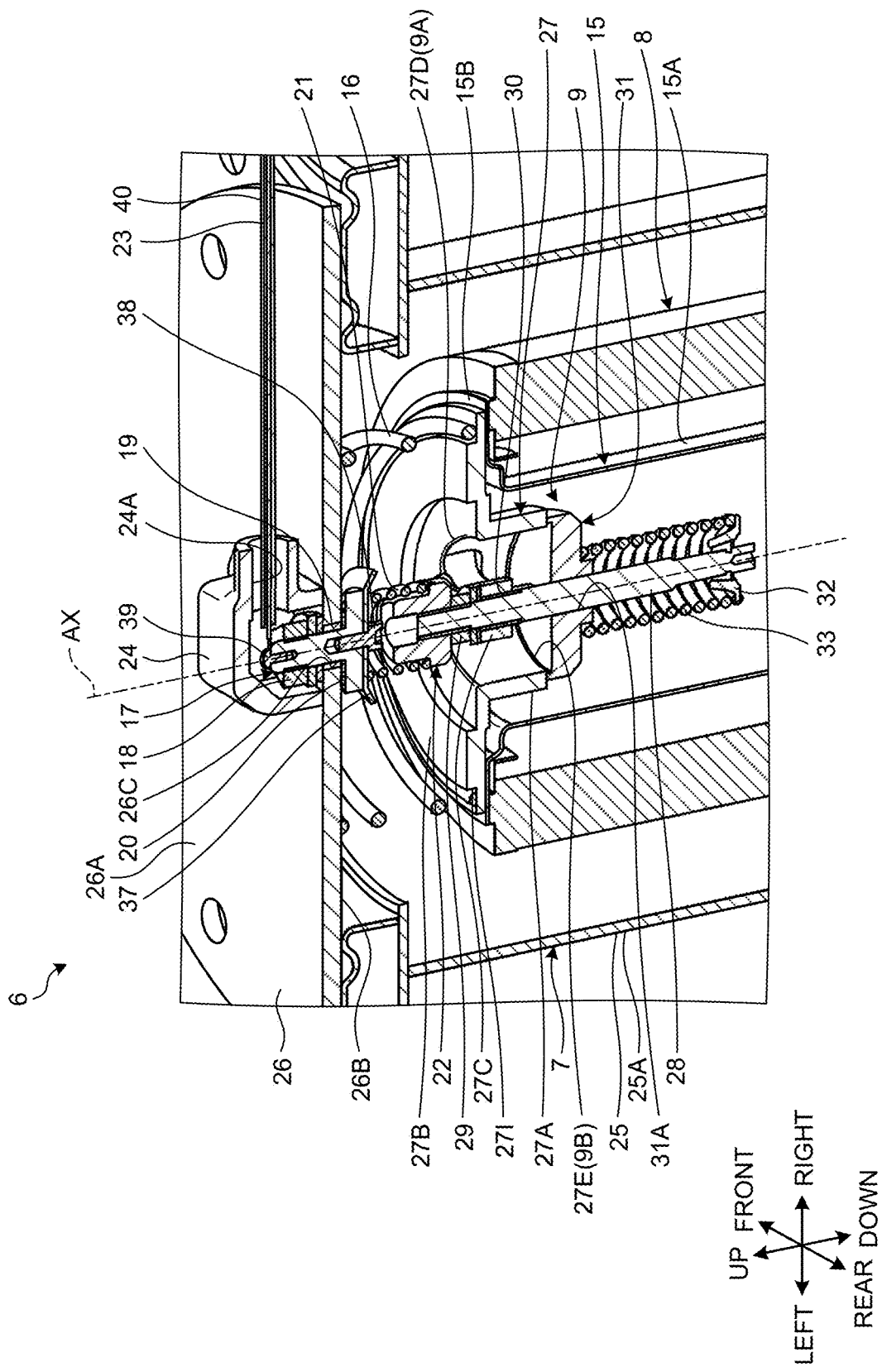
FIG. 6 is a rear perspective cross-sectional view illustrating a part of the oil filter device according to the first embodiment.
Figure 7:
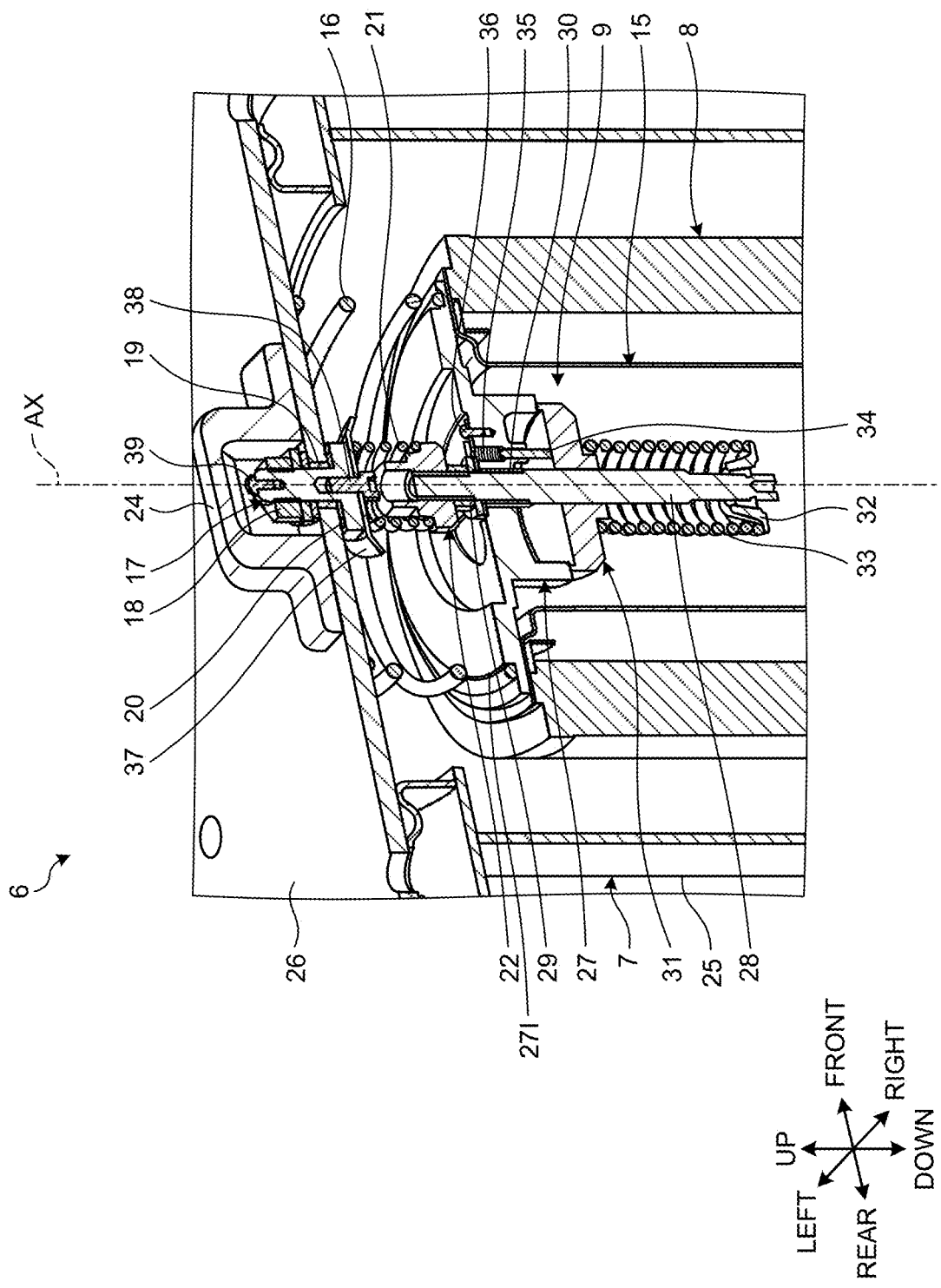
FIG. 7 is a right perspective cross-sectional view illustrating a part of the oil filter device according to the first embodiment.
Figure 8:
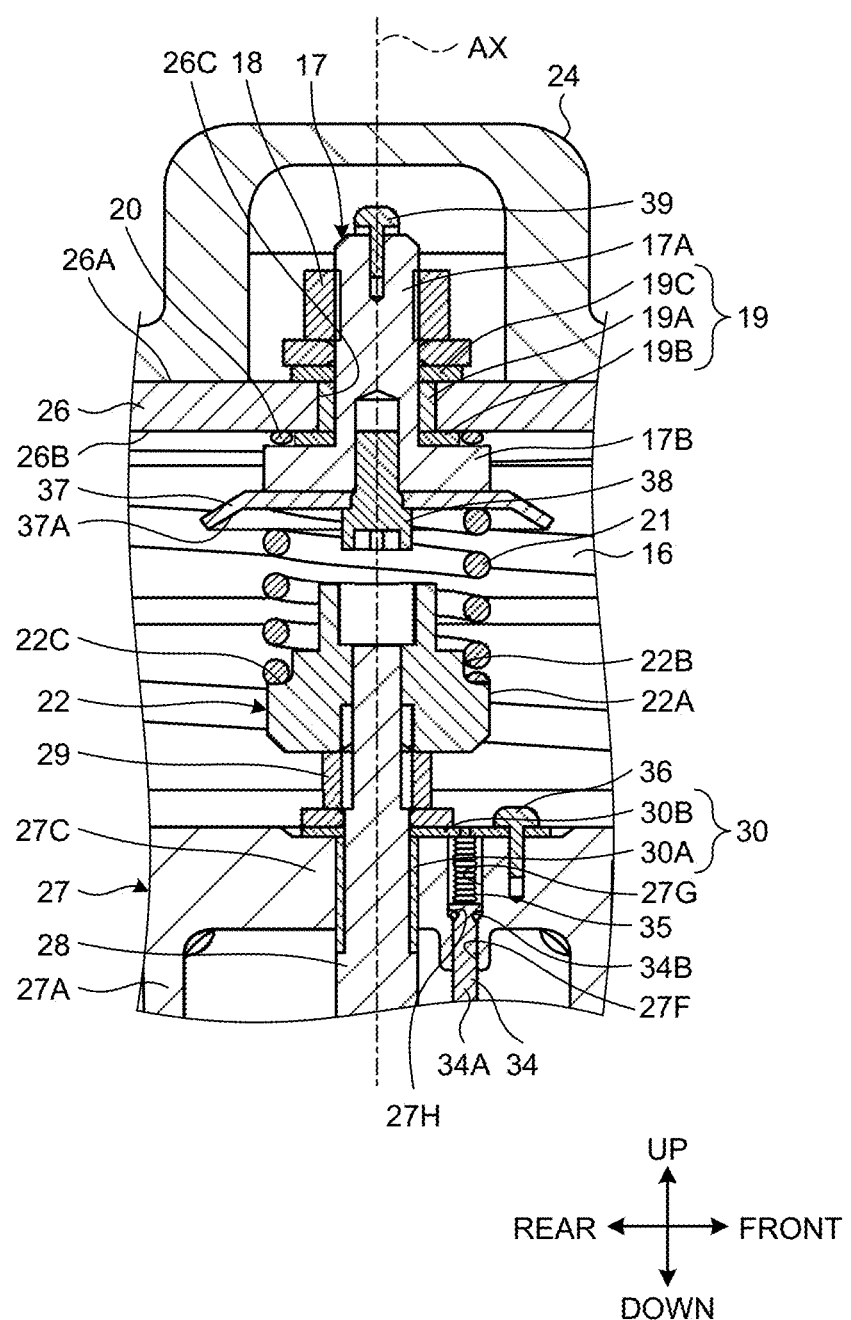
FIG. 8 is a cross-sectional view illustrating a part of the oil filter device according to the first embodiment.

FIG. 2 is a perspective view illustrating the oil filter device 6 according to the present embodiment. FIG. 3 is a cross-sectional view illustrating the oil filter device 6 according to the present embodiment and corresponds to a cross-sectional arrow view taken along line A-A in FIG. 2. FIG. 4 is a cross-sectional view illustrating a part of the oil filter device 6 according to the present embodiment, and corresponds to a partially enlarged view of FIG. 3. FIG. 5 is a cross-sectional view illustrating a part of the oil filter device 6 according to the present embodiment, and corresponds to a cross-sectional arrow view taken along line B-B in FIG. 2. FIG. 6 is a rear perspective cross-sectional view illustrating a part of the oil filter device 6 according to the present embodiment. FIG. 7 is a right perspective cross-sectional view illustrating a part of the oil filter device 6 according to the present embodiment. FIG. 8 is a cross-sectional view illustrating a part of the oil filter device 6 according to the present embodiment, and corresponds to a partially enlarged view of FIG. 4.

In the following description, the positional relationship of each portions will be described using terms "left", "right", "front", "rear", "up", and "down". These terms indicate the relative position or direction with respect to the center of the oil filter device 6.

A central axis AX is defined in the oil filter device 6. In the present embodiment, the central axis AX extends in the up-down direction. A direction parallel to the central axis AX is appropriately referred to as an axial direction. A direction around the central axis AX is appropriately referred to as a circumferential direction.

A radiating direction of the central axis AX is appropriately referred to as a radial direction. In the radial direction, a position closer to or a direction approaching the central axis AX is appropriately referred to as an inner side in the radial direction, while a position farther from or a direction moving away from the central axis AX is appropriately referred to as an outer side in the radial direction.

As illustrated in FIGS. 2, 3, 4, 5, 6, 7, and 8, the oil filter device 6 includes a filter case 7, a strainer 15, a filter element 8, a bypass valve 9, a case elastic member 16, an input member 17, a fixing member 18, a case insulating member 19, a seal member 20, a relay elastic member 21, a relay member 22, a lead wire 23, and a cover 24.

The filter case 7 has an internal space to accommodate the filter element 8 and the bypass valve 9. The filter case 7 includes a case body 25 and a lid 26.

The case body 25 includes a circumferential wall 25A and a bottom plate 25B. The circumferential wall 25A has a substantially cylindrical shape. In the present embodiment, the central axis AX of the oil filter device 6 is the central axis of the circumferential wall 25A. The bottom plate 25B is connected to the lower end of the circumferential wall 25A.

The lid 26 is disposed so as to cover a case opening 25C formed in the case body 25. The case opening 25C is provided at the upper end of the circumferential wall 25A. The lid 26 is fixed to the upper end of the case body 25 with a bolt (not illustrated), for example. The lid 26 has a disk shape. The lid 26 has an upper surface 26A and a lower surface 26B. The upper surface 26A of the lid 26 faces the external space of the filter case 7. The lower surface 26B of the lid 26 faces the internal space of the filter case 7.

The lid 26 is conductive. The lid 26 includes a conductive material. In the present embodiment, the lid 26 is formed with metal. Examples of the metal forming the lid 26 include iron and steel.

As described with reference to FIG. 1, the filter case 7 includes the inlet 7A of the hydraulic oil and the outlet 7B of the hydraulic oil. As illustrated in FIG. 3, the inlet 7A is provided in the circumferential wall 25A. The outlet 7B is provided in the bottom plate 25B. The hydraulic oil from the operation valve 4 flows into the internal space of the filter case 7 via the inlet 7A. The hydraulic oil flowing into the internal space of the filter case 7 flows out from the internal space of the filter case 7 via the outlet 7B. The hydraulic oil flowing out of the outlet 7B is supplied to the hydraulic oil tank 2.

The strainer 15 partitions the internal space of the filter case 7 into the main passage 11 and the bypass passage 12. With the presence of the strainer 15, the main passage 11 and the bypass passage 12 are provided in the internal space of the filter case 7. The strainer 15 includes a strainer body 15A and a flange portion 15B. The strainer 15 is provided in the main passage 11 in a closed state of the bypass valve 9. In the present embodiment, the strainer body 15A is formed with a metal mesh. The strainer 15 is a filter having a filtration rate higher than that of the filter element 8. In the open state of the bypass valve 9, the strainer 15 suppress entry of a large foreign substance fatal to the hydraulic system 1 into the bypass passage 12.

The strainer body 15A has a substantially cylindrical shape. The strainer body 15A is disposed so as to surround the central axis AX. The strainer body 15A is disposed inside the filter element 8 in the radial direction.

The flange portion 15B has a substantially annular shape. The flange portion 15B is disposed so as to surround the central axis AX. The flange portion 15B is disposed around the upper end of the strainer body 15A. The flange portion 15B protrudes outward from the upper end of the strainer body 15A in the radial direction.

At least a part of the main passage 11 is provided on the outer side of the strainer body 15A in the radial direction. At least a part of the bypass passage 12 is provided on the inner side of the strainer body 15A in the radial direction.

The filter element 8 is disposed in the main passage 11. The filter element 8 collects foreign substances from the hydraulic oil flowing through the main passage 11. The filter element 8 has a substantially cylindrical shape. The filter element 8 is disposed so as to surround the central axis AX. The filter element 8 includes a cylindrical filter medium. The filter element 8 is disposed on the outer side of the strainer body 15A in the radial direction. The flange portion 15B is supported on the upper surface of the filter element 8.

The filter element 8 has an outer surface 8C facing outward in the radial direction and an inner surface 8D facing inward in the radial direction. The inflow portion 8A of the filter element 8 includes the outer surface 8C. The outflow portion 8B of the filter element 8 includes the inner surface 8D. The hydraulic oil flowing into the internal space of the filter case 7 via the inlet 7A flows into the filter element 8 via the outer surface 8C. The hydraulic oil flowing into the filter element 8 via the outer surface 8C flows inward in the radial direction through the filter element 8. The hydraulic oil that has passed through the filter element 8 flows out from the inner surface 8D. The hydraulic oil passes through the filter element 8 to allow a foreign substance contained in the hydraulic oil to be collected by the filter element 8.

The bypass valve 9 is disposed in the bypass passage 12. The bypass valve 9 opens and closes the bypass passage 12. The bypass valve 9 has an inflow port 9A of hydraulic oil and an outflow port 9B of hydraulic oil. The inflow port 9A of the bypass valve 9 is connected to the inflow portion 8A of the filter element 8. The outflow port 9B of the bypass valve 9 is connected to the outflow portion 8B of the filter element 8.

The bypass valve 9 includes a valve body 27, a valve shaft 28, a positioning member 29, a valve insulating member 30, a valve disc 31, a support member 32, a valve elastic member 33, a movable member 34, and a disc elastic member 35.

The valve body 27 is disposed in the bypass passage 12. The valve body 27 is disposed so as to surround the central axis AX. The valve body 27 is supported by the filter element 8. The valve body 27 includes a sleeve portion 27A, a flange portion 27B, and a bridge portion 27C.

The sleeve portion 27A has a substantially cylindrical shape. The sleeve portion 27A is disposed so as to surround the central axis AX. The sleeve portion 27A is disposed inside the filter element 8. The sleeve portion 27A is disposed inside the strainer body 15A in the radial direction. The sleeve portion 27A has an inlet 27D of the hydraulic oil and an outlet 27E of the hydraulic oil. The inlet 27D is provided at the upper end of the sleeve portion 27A. The outlet 27E is provided at the lower end of the sleeve portion 27A. The inflow port 9A of the bypass valve 9 includes the inlet 27D. The outflow port 9B of the bypass valve 9 includes the outlet 27E.

The flange portion 27B has a substantially annular shape. The flange portion 27B is disposed so as to surround the central axis AX. The flange portion 27B is disposed around the upper end of the sleeve portion 27A. The flange portion 27B protrudes outward from the upper end of the sleeve portion 27A in the radial direction. The flange portion 27B is supported on the upper surface of the filter element 8. In the present embodiment, the flange portion 27B is supported by the upper surface of the filter element 8 via the flange portion 15B of the strainer 15.

The bridge portion 27C is disposed inside the sleeve portion 27A. The bridge portion 27C is disposed inside the sleeve portion 27A in the radial direction. The bridge portion 27C protrudes inward in the radial direction from the inner surface of the sleeve portion 27A facing inward in the radial direction.

The valve body 27 is conductive. The valve body 27 includes a conductive material. In the present embodiment, the valve body 27 is formed with metal. Examples of the metal forming the valve body 27 include aluminum and steel.

The valve shaft 28 is a rod-shaped member extending in the up-down direction. The central axis of the valve shaft 28 is substantially aligned with the central axis AX of the circumferential wall 25A. At least a part of the valve shaft 28 is disposed inside the valve body 27 in the radial direction. The valve shaft 28 is supported by the valve body 27. In the present embodiment, the valve shaft 28 is supported by the bridge portion 27C. At least a part of the bridge portion 27C is disposed around the valve shaft 28.

The valve shaft 28 is conductive. The valve shaft 28 includes a conductive material. In the present embodiment, the valve shaft 28 is formed with metal. Examples of the metal forming the valve shaft 28 include iron and steel.

The positioning member 29 is coupled to the valve shaft 28 to allow the valve shaft 28 to be positioned onto the valve body 27. The valve shaft 28 is positioned onto the valve body 27 by the positioning member 29. The positioning member 29 is disposed above the bridge portion 27C. The positioning member 29 is disposed around the valve shaft 28 above the bridge portion 27C. In the present embodiment, a screw thread is formed on the outer surface of the upper portion of the valve shaft 28. The positioning member 29 includes a nut having an internal thread to be coupled to a screw thread of the valve shaft 28. The positioning member 29, in a state of being coupled to the valve shaft 28, is supported by the upper surface of the bridge portion 27C. Since the positioning member 29 coupled to the valve shaft 28 is supported by the upper surface of the bridge portion 27C, a movement of the valve shaft 28 to a position below the valve body 27 is suppressed. The presence of the positioning member 29 suppresses a change in the relative position between the valve body 27 and the valve shaft 28.

The valve insulating member 30 insulates the valve body 27 and the valve shaft 28 from each other. The valve insulating member 30 has an electrically insulating property. The valve insulating member 30 is formed with an insulating material. In the present embodiment, the valve insulating member 30 is formed with synthetic resin.

The valve shaft 28 is supported by the valve body 27 via the valve insulating member 30. The current between the valve body 27 and the valve shaft 28 is interrupted by the valve insulating member 30.

In the present embodiment, the valve insulating member 30 includes: a first valve insulating member 30A disposed between the valve body 27 and the valve shaft 28; and a second valve insulating member 30B disposed between the valve body 27 and the positioning member 29.

The first valve insulating member 30A insulates the valve body 27 and the valve shaft 28 from each other. The first valve insulating member 30A interrupts the current between the valve body 27 and the valve shaft 28. The first valve insulating member 30A suppress the supply of current from the valve shaft 28 to the valve body 27. In the present embodiment, the first valve insulating member 30A is disposed between the inner surface of the bridge portion 27C and the outer surface of the valve shaft 28. The first valve insulating member 30A has a cylindrical shape. The first valve insulating member 30A is sandwiched between the inner surface of the bridge portion 27C and the outer surface of the valve shaft 28. The valve shaft 28 is supported by the bridge portion 27C via the first valve insulating member 30A.

The second valve insulating member 30B insulates the valve body 27 and the positioning member 29 from each other. The current is interrupted between the valve body 27 and the positioning member 29 by the second valve insulating member 30B. The second valve insulating member 30B suppresses supply of a current from the valve shaft 28 to the valve body 27 via the positioning member 29. In the present embodiment, the second valve insulating member 30B is disposed between the lower surface of the positioning member 29 and the upper surface of the bridge portion 27C. The second valve insulating member 30B has a sheet-like shape. The second valve insulating member 30B is sandwiched between the lower surface of the positioning member 29 and the upper surface of the bridge portion 27C. A part of the second valve insulating member 30B is fixed to the upper surface of the bridge portion 27C by a screw 36. The positioning member 29 is supported by the bridge portion 27C via the second valve insulating member 30B.

In the present embodiment, the first valve insulating member 30A is formed with polybutylene terephthalate (PBT) which is a thermoplastic resin. Polybutylene terephthalate is excellent in plasticity. The first valve insulating member 30A can be manufactured by injection molding of polybutylene terephthalate. The second valve insulating member 30B is formed with a glass epoxy resin which is a thermosetting resin. The glass epoxy resin has high mechanical strength and excellent heat resistance.

The valve disc 31 is movably supported by the valve shaft 28. The valve disc 31 is movable in the up-down direction with respect to the valve shaft 28. The valve disc 31 is disposed inside the strainer body 15A in the radial direction. The valve disc 31 is movable in the up-down direction on the inner side of the strainer body 15A in the radial direction. There is provided a slide hole 31A at the center of the valve disc 31. The slide hole 31A is provided so as to extend in the up-down direction. The valve shaft 28 is inserted into the slide hole 31A of the valve disc 31. The inner surface of the slide hole 31A is slidable with respect to the outer surface of the valve shaft 28. The valve disc 31 is guided in the up-down direction by the valve shaft 28.

The valve disc 31 comes into contact with the valve body 27 to close the bypass passage 12. The presence of the positioning member 29 suppresses a change in the relative position between the valve body 27 and the valve shaft 28. When the valve disc 31 moves in the up-down direction with respect to the valve shaft 28, the valve disc 31 changes either to a closed state in contact with the valve body 27 or to an open state separated from the valve body 27. Bringing the valve disc 31 to the closed state will close the bypass passage 12. Bringing the valve disc 31 to an open state will open the bypass passage 12.

The valve disc 31 is disposed below the valve body 27. The valve disc 31 is disposed below the sleeve portion 27A.

The valve disc 31 moves upward with respect to the valve shaft 28 to come into contact with the lower end of the sleeve portion 27A. When the valve disc 31 comes into contact with the lower end of the sleeve portion 27A, the outlet 27E at the lower end of the sleeve portion 27A is closed by the valve disc 31. In the present embodiment, the closed state of the valve disc 31 includes a state where the valve disc 31 is in contact with the lower end of the sleeve portion 27A and the outlet 27E is closed by the valve disc 31. Closing the outlet 27E with the valve disc 31 closes the bypass passage 12.

The valve disc 31 moves to the position below the valve shaft 28 to be separated from the lower end of the sleeve portion 27A. Separating the valve disc 31 from the lower end of the sleeve portion 27A opens the outlet 27E at the lower end of the sleeve portion 27A. In the present embodiment, the open state of the valve disc 31 includes a state where the valve disc 31 is separated from the lower end of the sleeve portion 27A to open the outlet 27E. Opening the outlet 27E opens the bypass passage 12.

The valve disc 31 is conductive. The valve disc 31 is formed with a conductive material. In the present embodiment, the valve disc 31 is formed with metal. Examples of the metal forming the valve disc 31 include iron and steel.

The support member 32 is fixed to the lower end of the valve shaft 28. The outer diameter of the support member 32 is larger than the outer diameter of the valve shaft 28.

The valve elastic member 33 generates an elastic force to bring the valve disc 31 into contact with the valve body 27. The valve elastic member 33 applies an elastic force to the valve disc 31 to bring the valve disc 31 into the closed state.

The valve elastic member 33 is disposed below the valve disc 31. The valve elastic member 33 is a compression coil spring disposed around the valve shaft 28 below the valve disc 31. The upper end of the valve elastic member 33 is connected to the lower surface of the valve disc 31. The lower end of the valve elastic member 33 is supported by the support member 32. The valve elastic member 33 applies an elastic force to the valve disc 31 to bring the valve disc 31 into contact with the lower end of the sleeve portion 27A.

The movable member 34 is connected to the valve body 27. At least a part of the movable member 34 comes into contact with the valve body 27. The movable member 34 is movably supported by the valve body 27. The movable member 34 is disposed inside the sleeve portion 27A. The movable member 34 is disposed inside the sleeve portion 27A in the radial direction. In the present embodiment, the movable member 34 is movably supported by the bridge portion 27C.

The movable member 34 is a rod-shaped member extending in the up-down direction. In the radial direction, the movable member 34 is disposed next to the valve shaft 28. The central axis of the movable member 34 extends in the up-down direction. The central axis of the movable member 34 and the central axis of the valve shaft 28 are substantially parallel to each other.

The movable member 34 includes a pin portion 34A and a flange portion 34B. The flange portion 34B is provided at the upper end of the pin portion 34A. The outer diameter of the flange portion 34B is larger than the outer diameter of the pin portion 34A.

The moving direction of the valve disc 31 and the moving direction of the movable member 34 are the same. As described above, the valve disc 31 is movable in the up-down direction with respect to the valve shaft 28. The movable member 34 is movable in the up-down direction with respect to the valve body 27. As illustrated in FIG. 8, the movable member 34 is disposed in a guide hole 27F provided in the bridge portion 27C. The movable member 34 is disposed so as to penetrate the guide hole 27F. The guide hole 27F is provided so as to extend in the up-down direction. At least a part of the outer surface of the movable member 34 and the inner surface of the guide hole 27F are in contact with each other. The movable member 34 is guided in the up-down direction by the guide hole 27F. The outer diameter of the flange portion 34B is smaller than the inner diameter of the guide hole 27F. The lower end of the guide hole 27F is open. The lower portion of the movable member 34 protrudes downward from the opening of the lower end of the guide hole 27F.

The movable member 34 is in contact with the valve disc 31 in a closed state where the valve disc 31 is in contact with the valve body 27. After the valve disc 31 is separated from the valve body 27, the movable member 34 moves to be separated from the valve disc 31. After the valve disc 31 changes from the closed state to the open state, the movable member 34 is separated from the valve disc 31.

In the present embodiment, the movable member 34 is disposed above the valve disc 31. In the closed state where the valve disc 31 is in contact with the valve body 27, the lower end of the movable member 34 comes into contact with the upper surface of the valve disc 31. After the valve disc 31 changes from the closed state to the open state, the lower end of the movable member 34 is separated from the upper surface of the valve disc 31.

The disc elastic member 35 generates an elastic force to bring the movable member 34 into contact with the valve disc 31. The disc elastic member 35 is supported by the valve body 27. In the present embodiment, the disc elastic member 35 is disposed above the movable member 34. The disc elastic member 35 applies elastic force to the movable member 34 to allow the movable member 34 to move downward. The lower end of the movable member 34 is pressed against the upper surface of the valve disc 31 by the elastic force of the disc elastic member 35.

As illustrated in FIG. 8, the disc elastic member 35 is disposed in an accommodation hole 27G provided in the bridge portion 27C. The accommodation hole 27G is provided above the guide hole 27F. The lower end of the accommodation hole 27G and the upper end of the guide hole 27F are connected to each other. The upper end of the accommodation hole 27G is open. The opening of the upper end of the accommodation hole 27G is covered with the second valve insulating member 30B. The upper end of the disc elastic member 35 is connected to the lower surface of the second valve insulating member 30B. A lower end of the disc elastic member 35 is connected to an upper end of the movable member 34.

The inner diameter of the accommodation hole 27G is larger than the inner diameter of the guide hole 27F. There is provided a stepped surface 27H formed between the lower end of the accommodation hole 27G and the upper end of the guide hole 27F. The stepped surface 27H faces upward. When the lower surface of the flange portion 34B of the movable member 34 comes into contact with the stepped surface 27H, the valve disc 31 changes from the closed state to the open state and thereafter the movable member 34 is separated from the upper surface of the valve disc 31.

The case elastic member 16 is disposed between the lid 26 and the valve body 27. The case elastic member 16 is a compression coil spring disposed around the central axis AX. The case elastic member 16 generates an elastic force to allow the valve body 27 to be pressed against the filter element 8. An upper end of the case elastic member 16 is connected to the lower surface 26B of the lid 26. The lower end of the case elastic member 16 is connected to the upper surface of the flange portion 27B of the valve body 27. In the present embodiment, there is provided a recess 27I on the upper surface of the flange portion 27B. The lower end of the case elastic member 16 is disposed in the recess 27I. With the lower end of the case elastic member 16 disposed in the recess 27I, the case elastic member 16 and the flange portion 27B are positioned. The case elastic member 16 generates an elastic force to allow the flange portion 27B to be pressed against the upper surface of the filter element 8 via the flange portion 15B.

As illustrated in FIG. 3, the lower surface of the filter element 8 faces the bottom plate 25B of the case body 25. The lower surface of the filter element 8 is pressed against the bottom plate 25B by the elastic force of the case elastic member 16. With the lower surface of the filter element 8 pressed against the bottom plate 25B, the filter element 8 is positioned onto the case body 25. The filter element 8 is positioned to set the central axis of the filter element 8 and the central axis AX of the circumferential wall 25A to be aligned with each other.

For example, when the filter element 8 is clogged, the filter element 8 is replaced. A dimensional error occurring in the up-down direction in the filter element 8 would lead to occurrence of a gap between the flange portion 27B and the filter element 8 or a gap between the filter element 8 and the bottom plate 25B when the filter element 8 is replaced. Occurrence of a gap might cause the hydraulic oil to flow out from the gap. In the present embodiment, the flange portion 27B is pressed against the upper surface of the filter element 8 via the flange portion 15B by the elastic force of the case elastic member 16. In addition, the lower surface of the filter element 8 is pressed against the bottom plate 25B by the elastic force of the case elastic member 16. This suppresses occurrence of a gap between the flange portion 27B and the filter element 8 or a gap between the filter element 8 and the bottom plate 25B.

Due to the elastic force of the case elastic member 16, the flange portion 15B of the strainer 15 is sandwiched between the lower surface of the flange portion 27B of the valve body 27 and the upper surface of the filter element 8. Sandwiching the flange portion 15B between the lower surface of the flange portion 27B and the upper surface of the filter element 8 suppresses a change in relative positions of the valve body 27, the strainer 15, and the filter element 8.

The case elastic member 16 is conductive. The case elastic member 16 is formed with a conductive material. In the present embodiment, the case elastic member 16 is formed with metal. Examples of the metal forming the case elastic member 16 include iron and steel.

The input member 17 is supported by the lid 26. As illustrated in FIG. 8, the input member 17 includes a shaft portion 17A and a plate portion 17B. The shaft portion 17A extends in the up-down direction. The plate portion 17B is connected to the lower end of the shaft portion 17A. The plate portion 17B has a disk shape. The diameter of the plate portion 17B is larger than the diameter of the shaft portion 17A.

The shaft portion 17A is disposed inside a through hole 26C provided in the lid 26. The through hole 26C penetrates the upper surface 26A of the lid 26 and the lower surface 26B of the lid 26. The through hole 26C is located in a central portion of the lid 26. The upper end of the shaft portion 17A is disposed above the upper surface 26A of the lid 26. The lower end of the shaft portion 17A is disposed below the lower surface 26B of the lid 26. The plate portion 17B is disposed below the lower surface 26B of the lid 26.

The input member 17 is conductive. The input member 17 is formed with a conductive material. In the present embodiment, the input member 17 is formed with metal. Examples of the metal forming the input member 17 include iron and steel.

The fixing member 18 is coupled to an upper portion of the shaft portion 17A to fix the input member 17 to the lid 26. The input member 17 is fixed to the lid 26 by the fixing member 18. The fixing member 18 is disposed above the upper surface 26A of the lid 26. The fixing member 18 is disposed around the shaft portion 17A above the lid 26. In the present embodiment, a screw thread is formed on the outer surface of the upper portion of the shaft portion 17A. The fixing member 18 includes a nut having an internal thread to be coupled to a screw thread of the shaft portion 17A. The fixing member 18 and the plate portion 17B sandwich the lid 26 in a state where the fixing member 18 is coupled to the shaft portion 17A. With the lid 26 sandwiched between the plate portion 17B and the fixing member 18 coupled to the shaft portion 17A, the input member 17 is fixed to the lid 26.

The case insulating member 19 insulates the input member 17 and the lid 26 from each other. The case insulating member 19 has an electrically insulating property. The case insulating member 19 is formed with an insulating material. In the present embodiment, the case insulating member 19 is formed with synthetic resin.

The input member 17 is supported by the lid 26 via the case insulating member 19. The current between the input member 17 and the lid 26 is interrupted by the case insulating member 19.

As illustrated in FIG. 8, the case insulating member 19 includes a first case insulating member 19A and a second case insulating member 19B disposed between the input member 17 and the lid 26, and a third case insulating member 19C disposed between the fixing member 18 and the lid 26.

The first case insulating member 19A and the second case insulating member 19B each insulates the input member 17 and the lid 26 from each other. The current is interrupted between the input member 17 and the lid 26 by the first case insulating member 19A and the second case insulating member 19B. The first case insulating member 19A and the second case insulating member 19B suppress supply of current from the input member 17 to the lid 26.

In the present embodiment, the first case insulating member 19A is disposed between the inner surface of the through hole 26C and the outer surface of the shaft portion 17A. The first case insulating member 19A has a cylindrical shape. The first case insulating member 19A is sandwiched between the inner surface of the through hole 26C and the outer surface of the shaft portion 17A. The second case insulating member 19B is disposed between the lower surface 26B of the lid 26 and the upper surface of the plate portion 17B. The second case insulating member 19B has a sheet-like shape. The second case insulating member 19B is sandwiched between the lower surface 26B of the lid 26 and the upper surface of the plate portion 17B. The input member 17 is supported by the lid 26 via the first case insulating member 19A and the second case insulating member 19B.

The third case insulating member 19C insulates the lid 26 from the fixing member 18. The third case insulating member 19C interrupts the current between the lid 26 and the fixing member 18. The third case insulating member 19C suppresses supply of current from the input member 17 to the lid 26 via the fixing member 18. In the present embodiment, the third case insulating member 19C is disposed between the lower surface of the fixing member 18 and the upper surface 26A of the lid 26. The third case insulating member 19C has a sheet-like shape. The third case insulating member 19C is sandwiched between the lower surface of the fixing member 18 and the upper surface 26A of the lid 26. The fixing member 18 is supported by the lid 26 via the third case insulating member 19C.

In the present embodiment, the first case insulating member 19A is formed with polybutylene terephthalate (PBT) which is a thermoplastic resin. Polybutylene terephthalate is excellent in plasticity. The first case insulating member 19A can be manufactured by injection molding of polybutylene terephthalate. The second case insulating member 19B and the third case insulating member 19C are each formed with glass epoxy resin which is thermosetting resin. The glass epoxy resin has high mechanical strength and excellent heat resistance.

The seal member 20 seals a boundary between the lid 26 and the input member 17. In the present embodiment, the seal member 20 includes an O-ring disposed around the second case insulating member 19B between the lower surface 26B of the lid 26 and the upper surface of the plate portion 17B. The seal member 20 suppresses leakage of the hydraulic oil in the internal space of the filter case 7 to the external space of the filter case 7 through the through hole 26C.

The relay elastic member 21 is disposed between the input member 17 and the relay member 22. The relay elastic member 21 is a coil spring disposed around the central axis AX. The relay elastic member 21 is disposed inside the case elastic member 16 in the radial direction.

The relay elastic member 21 is connected individually to the input member 17 and the relay member 22. The relay elastic member 21 is disposed below the input member 17. An upper end of the relay elastic member 21 is connected to the input member 17. A lower end of the relay elastic member 21 is connected to the relay member 22.

The relay elastic member 21 is conductive. The relay elastic member 21 is formed with a conductive material. In the present embodiment, the relay elastic member 21 is formed with metal. Examples of the metal forming the relay elastic member 21 include iron and steel.

In the present embodiment, a support plate 37 is fixed to the lower surface of the plate portion 17B of the input member 17. The support plate 37 is fixed to the plate portion 17B by a screw 38. The outer diameter of the support plate 37 is larger than the outer diameter of the plate portion 17B. As illustrated in FIG. 8, a peripheral edge 37A of the support plate 37 is inclined downward toward the outside in the radial direction. The upper end of the relay elastic member 21 comes into contact with the lower surface of the support plate 37 on the inner side of the peripheral edge 37A in the radial direction. An upper end of the relay elastic member 21 is connected to the input member 17 via the support plate 37. With the peripheral edge 37A, the upper end of the relay elastic member 21 is positioned on the support plate 37 in the radial direction.

The support plate 37 is conductive. The support plate 37 is formed with a conductive material. In the present embodiment, the support plate 37 is formed with metal. Examples of the metal forming the support plate 37 include iron and steel.

The relay member 22 is connected to the relay elastic member 21. At least a part of the relay member 22 is disposed below the relay elastic member 21. The relay member 22 supports the relay elastic member 21. The relay member 22 is fixed to the upper end of the valve shaft 28. The relay member 22 comes into contact with the valve shaft 28.

The relay member 22 is disposed above the positioning member 29. The relay member 22 is disposed around the valve shaft 28 above the positioning member 29. As described above, a screw thread is formed on the outer surface of the upper portion of the valve shaft 28. The relay member 22 includes a nut having an internal thread to be coupled to a screw thread of the valve shaft 28. The relay member 22, in a state of being coupled to the valve shaft 28, supports the lower end of the relay elastic member 21.

As illustrated in FIG. 8, the relay member 22 includes a base 22A and a protrusion 22B protruding upward from the base 22A. There is provided a support surface 22C around the protrusion 22B. The support surface 22C faces upward. The support surface 22C has an annular shape. The lower end of the relay elastic member 21 comes into contact with the support surface 22C. The protrusion 22B is inserted into a lower portion of the relay elastic member 21. The inner surface of the lower portion of the relay elastic member 21 comes into contact with the outer surface of the protrusion 22B. With the protrusion 22B, the lower end of the relay elastic member 21 is positioned on the relay member 22 in the radial direction.

The relay member 22 is conductive. The relay member 22 is formed with a conductive material. In the present embodiment, the relay member 22 is formed with metal. Examples of the metal forming the relay member 22 include iron and steel.

The lead wire 23 is connected to the input member 17. The lead wire 23 is disposed in an external space of the filter case 7. At least a part of the lead wire 23 is disposed above the lid 26. The upper end of the shaft portion 17A is disposed above the upper surface 26A of the lid 26. One end of the lead wire 23 is fixed to the upper end of the shaft portion 17A by a screw 39. At least a part of the surface of the lead wire is covered with an insulating film 40.

The cover 24 protects the upper end of the shaft portion 17A, the fixing member 18, and at least a part of the lead wire 23. The cover 24 is fixed to the upper surface 26A of the lid 26 so as to cover the upper end of the shaft portion 17A, the fixing member 18, and at least a part of the lead wire 23. On a part of the cover 24, there is provided a hole 24A in which at least a part of the lead wire 23 is disposed.

The cover 24 has an electrically insulating property. The cover 24 is formed with an insulating material. In the present embodiment, the cover 24 is formed with synthetic resin.

The controller 10 is disposed in an external space of the filter case 7. The controller 10 supplies current to the bypass valve 9 from the outside of the filter case 7. The controller 10 supplies current to the bypass valve 9 to determine whether the bypass passage 12 is closed based on the energization state of the bypass valve 9. The controller 10 includes: a power supply that supplies current to the bypass valve 9; and an energization detection circuit that detects an energization state of the bypass valve 9.

The bypass valve 9 is connected to the controller 10 via an input line 13. A part of the input line 13 is disposed in an external space of the filter case 7. A part of the input line 13 is disposed in the internal space of the filter case 7. The controller 10 supplies current to the bypass valve 9 from the outside of the filter case 7 via the input line 13. In the present embodiment, the input line 13 includes a lead wire 23, an input member 17, a support plate 37, a relay elastic member 21, and a relay member 22. The lead wire 23 and the upper end of the input member 17 are disposed in an external space of the filter case 7. The lower end of the input member 17, the support plate 37, the relay elastic member 21, and the relay member 22 are disposed in the internal space of the filter case 7.

The bypass valve 9 is connected to a ground part 42 via an output line 14. The ground part 42 includes a vehicle body frame of the work machine. A part of the output line 14 is disposed in the internal space of the filter case 7. A part of the output line 14 is disposed in an external space of the filter case 7. The output line 14 includes the case elastic member 16, the filter case 7, and a ground line 41. The case elastic member 16 is connected to the lid 26 of the filter case 7. As described above, the lid 26 is fixed to the upper end of the case body 25 with a bolt (not illustrated), for example. The lid 26 is electrically connected to the case body 25 via a bolt. The case elastic member 16 and the case body 25 are electrically connected to each other via the lid 26. The ground line 41 is connected to an upper portion of the case body 25. The case elastic member 16 is disposed in the internal space of the filter case 7. The ground line 41 is disposed in an external space of the filter case 7. The filter case 7 is a part of the hydraulic oil tank 2. The hydraulic oil tank 2 is connected to the ground part 42 via a ground line 41 by a bolt, for example.

<Operation of oil Filter Device>

Figure 9:
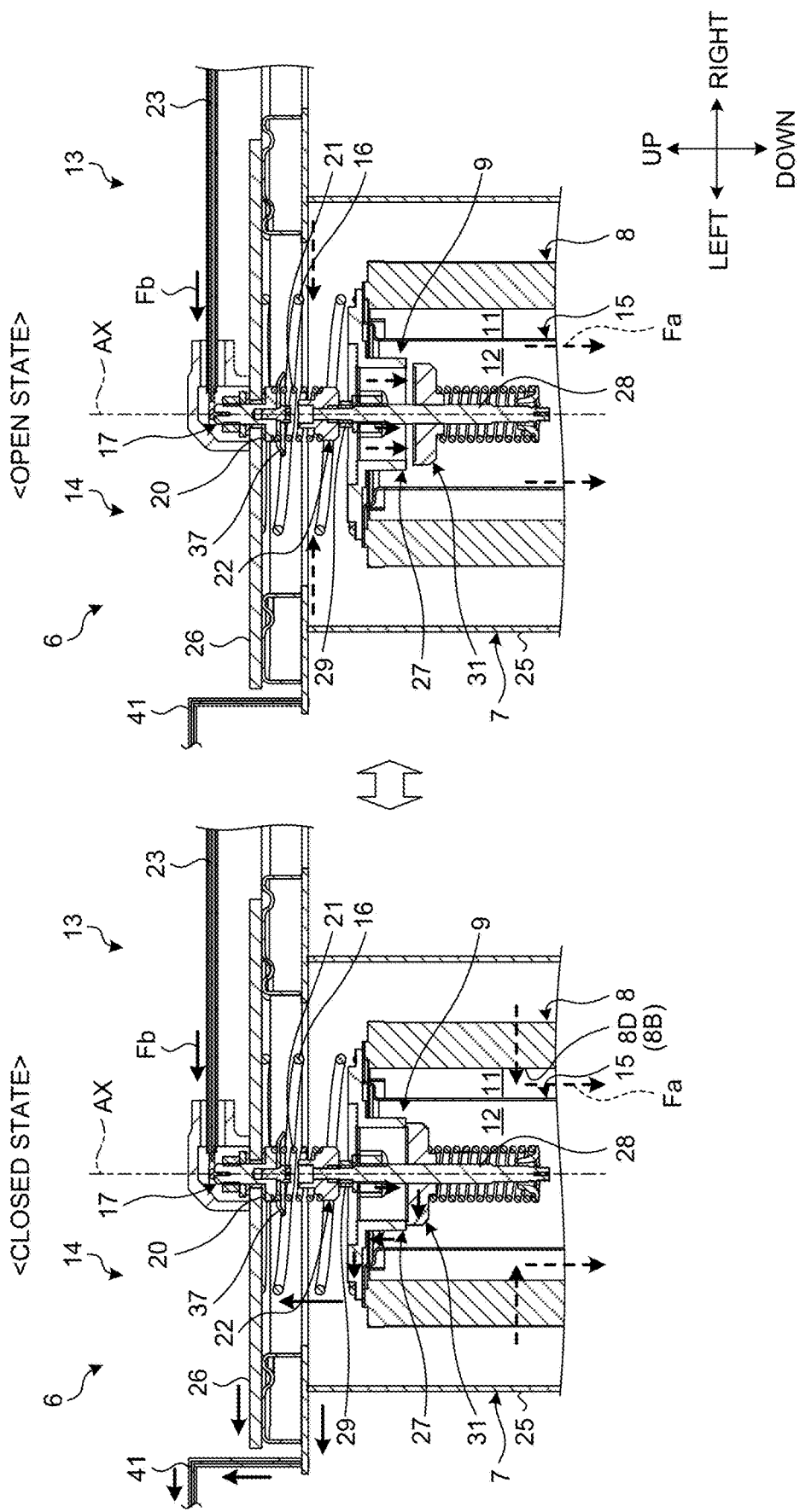
FIG. 9 is a diagram illustrating an operation of the oil filter device according to the first embodiment.

FIG. 9 is a diagram illustrating an operation of the oil filter device 6 according to the present embodiment. The bypass valve 9 opens and closes the bypass passage 12 based on a differential pressure indicating a difference between the pressure of the inflow portion 8A and the pressure of the outflow portion 8B of the filter element 8.

The foreign substance collected by the filter element 8 might clog the filter element 8. Clogging of the filter element 8 would increase the differential pressure between the inflow portion 8A and the outflow portion 8B. When the differential pressure between the inflow portion 8A and the outflow portion 8B is small, the bypass valve 9 operates to close the bypass passage 12. When the differential pressure between the inflow portion 8A and the outflow portion 8B is large, the bypass valve 9 operates to open the bypass passage 12. Opening the bypass passage 12 suppresses an excessive increase in the differential pressure between the inflow portion 8A and the outflow portion 8B. Suppressing an excessive increase of the differential pressure between the inflow portion 8A and the outflow portion 8B will prevent breakage of the filter element 8.

The state where the bypass passage 12 is closed includes a closed state where the valve disc 31 is in contact with the valve body 27. The state where the bypass passage 12 is opened includes an open state where the valve disc 31 is separated from the valve body 27. When the differential pressure is a specified value or less, the valve disc 31 comes into contact with the valve body 27 by the elastic force of the valve elastic member 33. When the differential pressure exceeds the specified value, the valve disc 31 moves to be separated from the valve body 27 based on the differential pressure against the elastic member of the valve elastic member 33. The specified value is a value predetermined for the differential pressure.

The controller 10 supplies current to the bypass valve 9 to determine whether the bypass passage 12 is closed based on the energization state of the bypass valve 9. The controller 10 includes: a power supply circuit that supplies current to the bypass valve 9; and an energization detection circuit that detects an energization state of the bypass valve 9.

In the present embodiment, supplying a current to the bypass valve 9 includes supplying a current to the valve disc 31. The energization state of the bypass valve 9 includes an energization state across the valve disc 31 and the valve body 27.

As indicated by arrow Fb in FIG. 9, the controller 10 supplies current to the valve disc 31 via the input member 17. The controller 10 supplies current to the valve disc 31 via the input member 17, and determines whether the bypass passage 12 is closed based on an energization state across the valve disc 31 and the valve body 27.

In the present embodiment, the controller 10 supplies current to the input member 17 via the lead wire 23. The current supplied to the input member 17 via the lead wire 23 is supplied to the valve shaft 28 via the support plate 37, the relay elastic member 21, and the relay member 22. The current supplied to the valve shaft 28 is supplied to the valve disc 31 via the valve shaft 28.

In the closed state where the valve disc 31 is in contact with the valve body 27, the current supplied to the valve disc 31 is supplied to the valve body 27. That is, in the closed state where the valve disc 31 is in contact with the valve body 27, energization across the valve disc 31 and the valve body 27 is performed. In a closed state where the valve disc 31 is in contact with the valve body 27, the bypass passage 12 is closed. When having detected energization across the valve disc 31 and the valve body 27, the controller 10 can determine that the bypass passage 12 is closed.

In a closed state where the valve disc 31 is in contact with the valve body 27, as indicated by arrow Fb in FIG. 9, the current supplied to the valve disc 31 flows through the valve body 27 and then is supplied to the lid 26 via the case elastic member 16. The current supplied to the lid 26 flows through the case body 25 and then flows through the ground line 41.

In the open state where the valve disc 31 is separated from the valve body 27, the current supplied to the valve disc 31 is not supplied to the valve body 27 as indicated by arrow Fb in FIG. 9. That is, in the open state where the valve disc 31 is separated from the valve body 27, energization across the valve disc 31 and the valve body 27 is not performed. In the open state where the valve disc 31 is separated from the valve body 27, the bypass passage 12 is opened. When having detected non-energization across the valve disc 31 and the valve body 27, the controller 10 can determine that the bypass passage 12 is open.

In the closed state where the valve disc 31 is in contact with the valve body 27, as indicated by arrow Fa in FIG. 9, the hydraulic oil flowing into the internal space of the filter case 7 from the inlet 7A passes through the main passage 11 including the filter element 8, and then flows out from the outlet 7B to be supplied to the hydraulic oil tank 2.

In the open state where the valve disc 31 is separated from the valve body 27, as indicated by arrow Fa in FIG. 9, at least a part of the hydraulic oil flowing into the internal space of the filter case 7 from the inlet 7A passes through the bypass passage 12 including the outlet 27E of the valve body 27, then flows out from the outlet 7B to be supplied to the hydraulic oil tank 2.

<Operation of Movable Member>

Figure 10:
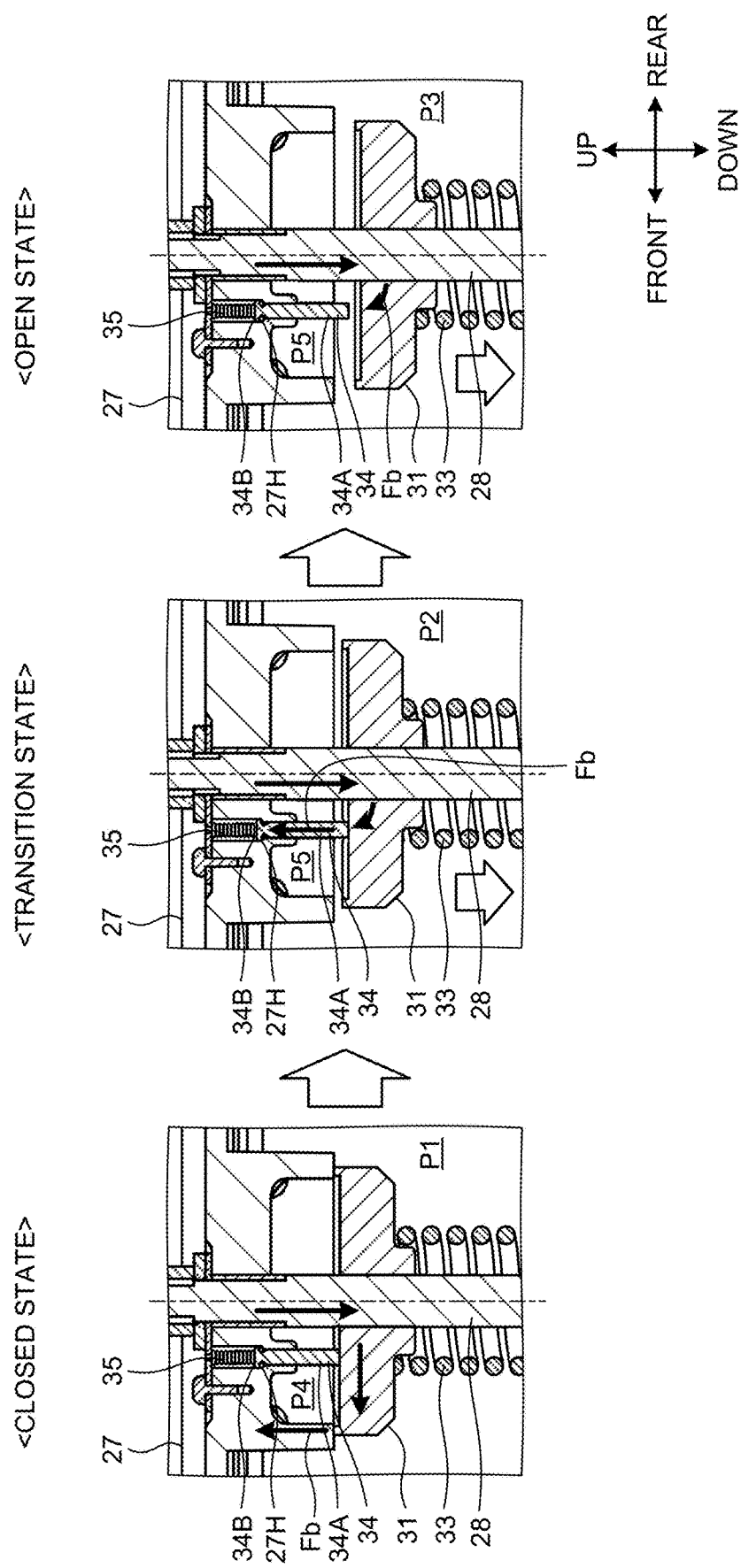
FIG. 10 is a diagram illustrating operations of a valve disc and a movable member according to the first embodiment.

FIG. 10 is a diagram illustrating operations of the valve disc 31 and the movable member 34 according to the present embodiment. As illustrated in FIG. 10, based on the differential pressure between the inflow portion 8A and the outflow portion 8B, the valve disc 31 changes from the closed state in contact with the valve body 27 to the open state of being separated from the valve body 27 through the transition state of being slightly separated from the valve body 27. In the closed state, the valve disc 31 is disposed at a closed position P1 in contact with the valve body 27. In the open state, the valve disc 31 is disposed at an open position P3 below the closed position P1. In the transition state, the valve disc 31 is disposed at a transition position P2 between the closed position P1 and the open position P3.

When the valve disc 31 is disposed at the closed position P1, the movable member 34 comes into contact with the valve disc 31. The lower end of the movable member 34 is pressed against the upper surface of the valve disc 31 by the elastic force of the disc elastic member 35. In the closed state of the valve disc 31, the flange portion 34B of the movable member 34 is disposed above the stepped surface 27H. In the closed state of the valve disc 31, a gap is formed between the lower surface of the flange portion 34B and the stepped surface 27H. When the valve disc 31 is disposed at the closed position P1, the movable member 34 is disposed at an upper end position P4 where the lower end of the movable member 34 and the upper surface of the valve disc 31 are in contact with each other and a gap is formed between the lower surface of the flange portion 34B and the stepped surface 27H.

Even when the valve disc 31 has moved from the closed position P1 to the transition position P2, the movable member 34 comes into contact with the valve disc 31. The lower end of the movable member 34 moves to a position below the valve body 27 so as to be pressed against the upper surface of the valve disc 31 by the elastic force of the disc elastic member 35. When the valve disc 31 is disposed at the transition position P2, the flange portion 34B of the movable member 34 comes into contact with the stepped surface 27H. When the valve disc 31 is disposed at the transition position P2, the movable member 34 is disposed at a lower end position P5 where the lower end of the movable member 34 and the upper surface of the valve disc 31 are in contact with each other and the lower surface of the flange portion 34B and the stepped surface 27H are in contact with each other.

The movable range of the valve disc 31 is a range between the closed position P1 and the open position P3. The movable range of the movable member 34 is a range between the upper end position P4 and the lower end position P5. The movable range of the valve disc 31 is larger than the movable range of the movable member 34.

When the valve disc 31 moves from the transition position P2 to the open position P3, the movable member 34 is separated from the valve disc 31. That is, when the valve disc 31 moves from the transition position P2 to the open position P3, the lower end of the movable member 34 is separated from the upper surface of the valve disc 31 in a state where the lower surface of the flange portion 34B and the stepped surface 27H are in contact with each other.

In this manner, when the valve disc 31 disposed in the closed position P1 moves to be separated from the valve body 27, the movable member 34 changes from the state of being in contact with the valve disc 31 to the state of being separated from the valve disc 31. The movable member 34 is in contact with the valve disc 31 in a closed state where the valve disc 31 is in contact with the valve body 27; the member is separated from the valve disc 31 after a transition state where the valve disc 31 is separated from the valve body 27.

In the closed state where the valve disc 31 is in contact with the valve body 27, the current supplied to the valve shaft 28 flows through the valve disc 31 and then flows through the valve body 27 as indicated by arrow Fb in FIG. 10. The current flowing through the valve body 27 flows through the case elastic member 16 and then flows through the lid 26.

In the transition state where the valve disc 31 is separated from the valve body 27 and the movable member 34 is in contact with the valve disc 31, as indicated by arrow Fb in FIG. 10, the current supplied to the valve shaft 28 flows through the valve disc 31 and then flows through the movable member 34. The movable member 34 is connected to the valve body 27. Accordingly, the current flowing through the movable member 34 flows through the valve body 27. The current flowing through the valve body 27 flows through the case elastic member 16 and then flows through the lid 26.

In the open state where the valve disc 31 is separated from the valve body 27 and the movable member 34 is separated from the valve disc 31, the current supplied to the valve shaft 28 is interrupted at the valve disc 31 as indicated by arrow Fb in FIG. 10.

The valve disc 31 changes from the closed state to the open state in a state of being immersed in the hydraulic oil. In addition, the valve disc 31 changes from the closed state to the open state in a state where the current is supplied. When the valve disc 31 changes from the closed state to the open state, there is a possibility of occurrence of electric discharge (arc discharge) in the hydraulic oil between the valve disc 31 and the valve body 27. When electric discharge occurs in the hydraulic oil between the valve disc 31 and the valve body 27, carbides precipitated from the hydraulic oil can adhere to at least either one of the valve disc 31 or the valve body 27. Adhesion of carbide to at least either one of the contact surface of the valve disc 31 in contact with the valve body 27 or the contact surface of the valve body 27 in contact with the valve disc 31 leads to a possibility of occurrence of a contact failure between the valve disc 31 and the valve body 27. When adhesion of carbide to at least either one of the contact surface of the valve disc 31 or the contact surface of the valve body 27 causes a contact failure between the valve disc 31 and the valve body 27, there is a possibility that no current flows from the valve disc 31 to the valve body 27 even when the differential pressure is a specified value or less. When a contact failure occurs between the valve disc 31 and the valve body 27, the controller 10 can erroneously determine that the differential pressure exceeds a specified value even though the differential pressure is the specified value or less. That is, there is a possibility that the controller 10 fails to accurately detect the opening and closing of the bypass passage 12.

In the present embodiment, there is provided the conductive movable member 34, which separates from the valve disc 31 after the valve disc 31 separates from the valve body 27. The movable member 34 is connected to the valve body 27. In the transition state where the valve disc 31 is separated from the valve body 27 and the movable member 34 is in contact with the valve disc 31, the current supplied to the valve shaft 28 flows through the valve disc 31 and then flows through the movable member 34. In the transition state, the current supplied to the valve shaft 28 is supplied to the movable member 34 via the valve disc 31. This suppresses occurrence of electric discharge in the hydraulic oil between the valve disc 31 and the valve body 27. That is, this suppress adhesion of carbide to the contact surface of the valve disc 31 and the contact surface of the valve body 27. With suppression of adhesion of carbide to the contact surface of the valve disc 31 and the contact surface of the valve body 27 and suppression of occurrence of a contact failure between the valve disc 31 and the valve body 27, the controller 10 can accurately detect the opening and closing of the bypass passage 12.

When the movable member 34 is separated from the valve disc 31, there is a possibility of occurrence of electric discharge in the hydraulic oil between the movable member 34 and the valve disc 31, leading to a possibility of adhesion of carbide to at least either one of the movable member 34 or the valve body 27. The carbide is sufficiently thin. Therefore, even when the carbide adheres to the lower end of the movable member 34, for example, the valve disc 31 and the valve body 27 can come into contact with each other when the differential pressure is a specified value or less. That is, even with adhesion of carbide to the lower end of the movable member 34, the current supplied to the valve disc 31 can flow through the valve body 27 when the differential pressure is a specified value or less. Furthermore, even with adhesion of carbide to the lower end of the movable member 34, the gap between the movable member 34 and the valve disc 31, when the valve disc 31 changes from the closed state to the open state through the transition state, is smaller than the gap between the valve body 27 and the valve disc 31 in the transition state. Therefore, electric discharge is only generated between the movable member 34 and the valve disc 31, and occurrence of electric discharge between the valve disc 31 and the valve body 27 is suppressed.

<Effects>

As described above, according to the present embodiment, there is provided the conductive movable member 34, which separates from the valve disc 31 after the valve disc 31 separates from the valve body 27. The movable member 34 is connected to the valve body 27. In the transition state where the valve disc 31 is separated from the valve body 27 and the movable member 34 is in contact with the valve disc 31, the current supplied to the valve shaft 28 flows through the valve disc 31 and then flows through the movable member 34. In the transition state, the current supplied to the valve shaft 28 is supplied to the movable member 34 via the valve disc 31. This suppresses occurrence of electric discharge in the hydraulic oil between the valve disc 31 and the valve body 27. That is, this suppress adhesion of carbide to the contact surface of the valve disc 31 and the contact surface of the valve body 27. This suppresses the occurrence of the contact failure between the valve disc 31 and the valve body 27, making it possible for the controller 10 to accurately detect the opening and closing of the bypass passage 12.

When the differential pressure indicating the difference between the pressure at the inflow portion 8A and the pressure at the outflow portion 8B of the filter element 8 exceeds a specified value, the valve disc 31 moves to be separated from the valve body 27. When the valve disc 31 moves to be separated from the valve body 27, the movable member 34 changes from a state of being in contact with the valve disc 31 to a state of being separated from the valve disc 31. The movable member 34 suppresses the occurrence of electric discharge in the hydraulic oil between the valve disc 31 and the valve body 27.

The movable range of the valve disc 31 is larger than the movable range of the movable member 34. With this configuration, the contact between the movable member 34 and the valve disc 31 is maintained in the section where the valve disc 31 moves from the closed position P1 to the transition position P2, and the movable member 34 can be separated from the valve disc 31 when the valve disc 31 moves from the transition position P2 to the open position P3.

The moving direction of the valve disc 31 and the moving direction of the movable member 34 are the same. In the present embodiment, when the differential pressure changes from a specified value or less to a value greater than the specified value, the valve disc 31 moves to a position below the valve shaft 28 and the valve body 27, and the movable member 34 moves to a position below the valve body 27. This suppresses complication of the structure of the bypass valve 9.

The valve disc 31 is disposed below the valve body 27. The movable member 34 is disposed above the valve disc 31. This suppresses enlargement of the bypass valve 9.

The valve disc 31 is disposed below the sleeve portion 27A of the valve body 27. The valve disc 31 comes into contact with the lower end of the sleeve portion 27A to close the bypass passage 12. This suppresses enlargement of the bypass valve 9.

The movable member 34 is disposed inside the sleeve portion 27A. This suppresses enlargement of the bypass valve 9.

The movable member 34 is disposed next to the valve shaft 28. With this configuration, the movable member 34 is less likely to be affected by the fluid force of the hydraulic oil flowing inside the valve body 27, and can move smoothly with respect to the valve body 27.

At least a part of the movable member 34 comes into contact with the valve body 27. With this configuration, the current supplied from the valve disc 31 to the movable member 34 is supplied to the valve body 27.

The disc elastic member 35 generates an elastic force to bring the movable member 34 into contact with the valve disc 31. With this configuration, the movable member 34 can continue to be in contact with the valve disc 31 when the valve disc 31 changes from the closed state to the transition state.

The case elastic member 16 is disposed between the lid 26 and the valve body 27. In a closed state where the valve disc 31 is in contact with the valve body 27, the current supplied to the valve disc 31 flows through the valve body 27 and the case elastic member 16, and then flows through the lid 26. The lid 26 is connected to the ground part 42 via the case body 25 and ground line 41. In the open state where the valve disc 31 is separated from the valve body 27, the current supplied to the valve disc 31 does not flow through the filter case 7 including the case body 25 and the lid 26. With this configuration, the electric resistance value of the electric circuit, including the input line 13, the bypass valve 9, and the output line 14, changes between the closed state of the valve disc 31 and the open state of the valve disc 31. The controller 10 can determine whether the bypass passage 12 is closed based on the electric resistance value.

The lid 26 and the valve body 27 are connected to each other via the case elastic member 16. For example, an increase in the pressure of the hydraulic oil stored in the internal space of the filter case 7 would upwardly deform or displace the lid 26, leading to occurrence of a change in the relative position between the lid 26 and the valve body 27. When the lid 26 and the valve body 27 are connected to each other via the case elastic member 16, the lid 26 and the valve body 27 can move relative to each other. With this configuration, a change in the relative position between the lid 26 and the valve body 27 is permitted.

In the present embodiment, current is supplied to the valve disc 31 from the outside of the filter case 7 via the input member 17. The controller 10 determines whether the bypass passage 12 is closed based on the energization state across the valve disc 31 of the bypass valve 9 and the valve body 27. This simplifies the structure of the oil filter device 6. Even with no sensor for detecting opening and closing of the bypass passage, by supplying a current to the valve disc 31 from the outside of the filter case 7 via the input member 17, it is possible to determine, with a simple configuration, whether the bypass passage 12 is closed.

Furthermore, energization is performed across the valve disc 31 and the valve body 27 in a closed state where the valve disc 31 is in contact with the valve body 27, while energization across the valve disc 31 and the valve body 27 is interrupted when the valve disc 31 is in an open state of being separated from the valve body 27. With this configuration, the controller 10 can accurately determine the timing at which the bypass passage 12 is opened and closed based on the energization state across the valve disc 31 and the valve body 27.

The input member 17 is supported by the lid 26 via the case insulating member 19. The valve shaft 28 is supported by the valve body 27 via the valve insulating member 30. With this configuration, the current supplied to the input member 17 is smoothly supplied to the valve disc 31 via the relay elastic member 21, the relay member 22, and the valve shaft 28.

The input member 17 and the relay member 22 are connected to each other via the relay elastic member 21. For example, an increased pressure of the hydraulic oil stored in the internal space of the filter case 7 would upwardly deform or displace the lid 26, having a possibility to change the relative position between the input member 17 and the relay member 22. Since the input member 17 and the relay member 22 are connected to each other via the relay elastic member 21, the input member 17 and the relay member 22 can move relative to each other. With this configuration, a change in the relative position between the input member 17 and the relay member 22 is permitted.

The input member 17 is connected to the lead wire 23 disposed in an external space of the filter case 7. The controller 10 supplies current to the input member 17 via the lead wire 23. This makes it possible for the controller 10 to supply a current to the input member 17 from a position away from the filter case 7.

The input member 17 includes the shaft portion 17A disposed inside the through hole 26C provided in the lid 26. This makes it possible for the input member 17 to receive a current from the controller 10 disposed in the external space of the filter case 7 and supply a current to the valve disc 31 disposed in the internal space of the filter case 7. The case insulating member 19 includes the first case insulating member 19A disposed between the inner surface of the through hole 26C and the outer surface of the shaft portion 17A. The lid 26 and the shaft portion 17A are insulated from each other by the first case insulating member 19A.

The input member 17 includes the plate portion 17B connected to the lower end of the shaft portion 17A. The case insulating member 19 includes the second case insulating member 19B disposed between the lower surface 26B of the lid 26 and the upper surface of the plate portion 17B. The lid 26 and the plate portion 17B are insulated from each other by the second case insulating member 19B.

The input member 17 is fixed to the lid 26 by the fixing member 18 coupled to the upper portion of the shaft portion 17A. The fixing member 18 suppresses a change in the relative position between the lid 26 and the input member 17. The case insulating member 19 includes the third case insulating member 19C disposed between the lower surface of the fixing member 18 and the upper surface 26A of the lid 26. The lid 26 and the fixing member 18 coupled to the shaft portion 17A are insulated from each other by the third case insulating member 19C.

There is provided the seal member 20 that seals a boundary between the lid 26 and the input member 17. The seal member 20 suppresses leakage of the hydraulic oil in the internal space of the filter case 7 to the external space of the filter case 7 through the boundary between the lid 26 and the input member 17.

The valve body 27 is supported by the filter element 8. The case elastic member 16 generates an elastic force to allow the valve body 27 to be pressed against the filter element 8. This suppresses a change in the relative position between the valve body 27 and the filter element 8.

The filter element 8 has a cylindrical shape. The valve body 27 includes: the sleeve portion 27A disposed inside the filter element 8; and the flange portion 27B supported on an upper surface of the filter element 8. The case elastic member 16 generates an elastic force to allow the flange portion 27B to be pressed against the upper surface of the filter element 8. This suppresses enlargement of the oil filter device 6.

The valve body 27 includes the bridge portion 27C that is disposed inside the sleeve portion 27A and supports the valve shaft 28. The valve insulating member 30 includes the first valve insulating member 30A disposed between the bridge portion 27C and the valve shaft 28. The bridge portion 27C and the valve shaft 28 are insulated from each other by the first valve insulating member 30A.

The valve shaft 28 and the valve body 27 are positioned by the positioning member 29. The positioning member 29 is coupled to the valve shaft 28 above the bridge portion 27C. Since the positioning member 29 coupled to the valve shaft 28 is supported by the upper surface of the bridge portion 27C, a movement of the valve shaft 28 to a position below the valve body 27 is suppressed. The presence of the positioning member 29 suppresses a change in the relative position between the valve body 27 and the valve shaft 28. The valve insulating member 30 includes the second valve insulating member 30B disposed between the lower surface of the positioning member 29 and the upper surface of the bridge portion 27C. The bridge portion 27C of the valve body 27 and the positioning member 29 coupled to the valve shaft 28 are insulated from each other by the second valve insulating member 30B.

The valve disc 31 is disposed below the valve body 27. The valve elastic member 33 is disposed below the valve disc 31. This suppresses enlargement of the bypass valve 9.

The support member 32 is fixed to the lower end of the valve shaft 28. The upper end of the valve elastic member 33 is connected to the valve disc 31. The lower end of the valve elastic member 33 is supported by the support member 32. When the differential pressure is a specified value or less, the valve disc 31 is pressed against the valve body 27 by the elastic force of the valve elastic member 33.

Second Embodiment

A second embodiment will be described. In the following description, the same or equivalent components as those in the above-described embodiment are designated by the same reference numerals, and the description of the components will be simplified or omitted.

<Bypass Valve>

Figure 11:
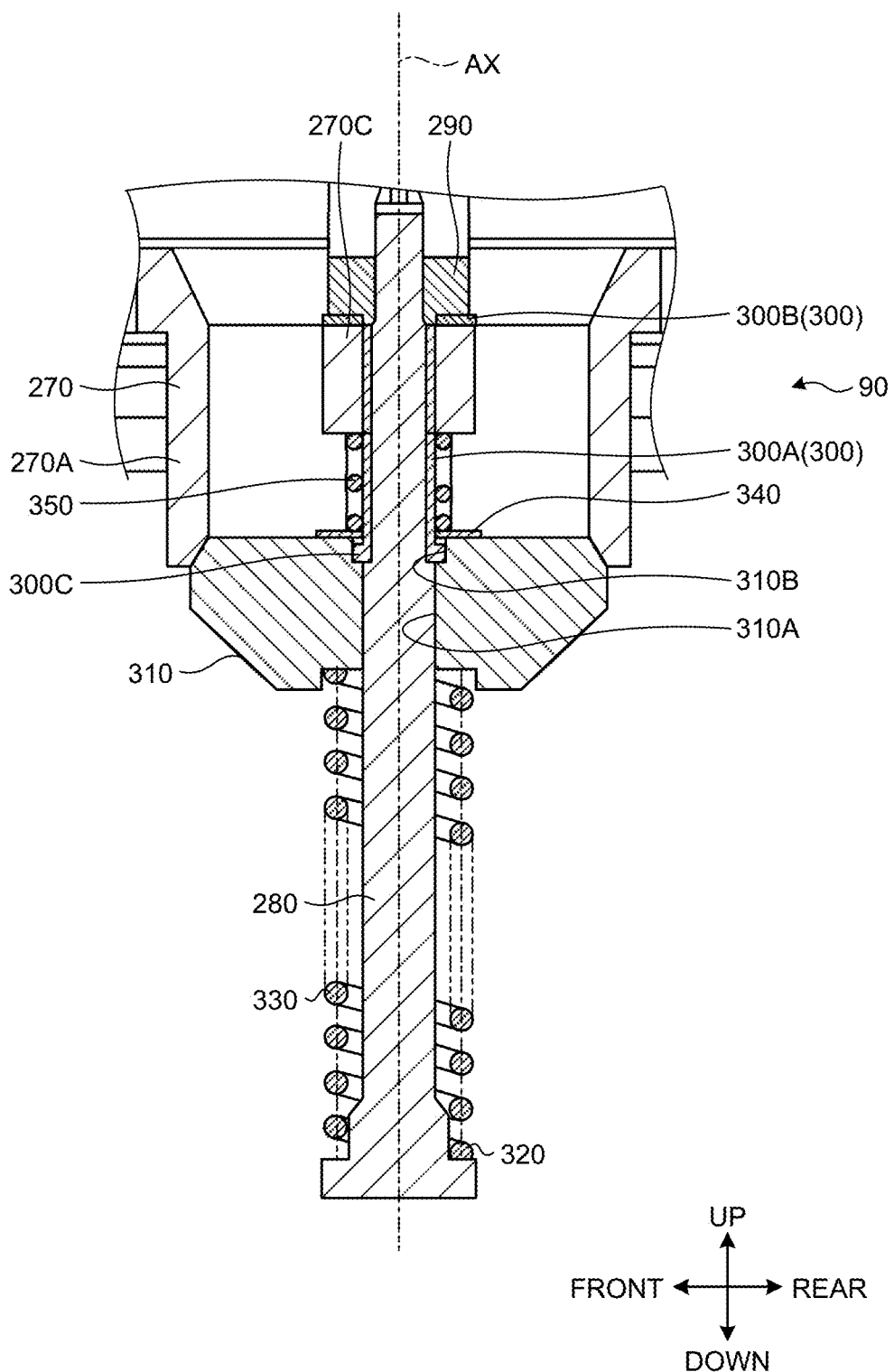
FIG. 11 is a cross-sectional view illustrating a bypass valve according to a second embodiment.

FIG. 11 is a cross-sectional view illustrating a bypass valve 90 according to the present embodiment. The bypass valve 90 includes a valve body 270, a valve shaft 280, a positioning member 290, a valve insulating member 300, a valve disc 310, a valve elastic member 330, a movable member 340, and a disc elastic member 350.

The valve body 270 is disposed in the bypass passage 12. The valve body 27 is conductive. The valve body 270 is disposed so as to surround the central axis AX. The valve body 270 includes a sleeve portion 270A and a bridge portion 270C.

The sleeve portion 270A has a substantially cylindrical shape. The sleeve portion 270A is disposed so as to surround the central axis AX. The bridge portion 270C is disposed inside the sleeve portion 270A in the radial direction.

The valve shaft 280 is a rod-shaped member extending in the up-down direction. The central axis of the valve shaft 28 is substantially aligned with the central axis AX of the circumferential wall 25A. The valve shaft 280 is conductive. The valve shaft 280 is supported by the bridge portion 270C.

The positioning member 290 is coupled to the valve shaft 280 so as to allow the valve shaft 280 to be positioned onto the valve body 270. The positioning member 290 is disposed around the valve shaft 280 above the bridge portion 270C.

The valve insulating member 300 insulates the valve body 270 and the valve shaft 280 from each other. The valve insulating member 300 has an electrically insulating property. The valve insulating member 300 includes: a first valve insulating member 300A disposed around the valve shaft 280; and a second valve insulating member 300B disposed between the valve body 270 and the positioning member 290.

The first valve insulating member 300A has a substantially cylindrical shape. The upper portion of the first valve insulating member 300A is disposed between the inner surface of the bridge portion 270C and the outer surface of the valve shaft 280. The lower portion of the first valve insulating member 300A is disposed below the bridge portion 270C.

The valve disc 310 is movably supported by the valve shaft 280. The valve disc 310 is movable in the up-down direction. The valve disc 310 is conductive. The valve disc 310 is movable in the up-down direction with respect to the valve shaft 280. There is provided a slide hole 310A at the center of the valve disc 310. The valve shaft 280 is inserted into the slide hole 310A of the valve disc 310.

The valve elastic member 330 generates an elastic force to bring the valve disc 310 into contact with the valve body 270. The valve elastic member 330 is disposed below the valve disc 310. The upper end of the valve elastic member 330 is connected to the lower surface of the valve disc 310. The lower end of the valve elastic member 330 is supported by a support portion 320 provided at the lower end of the valve shaft 280. The valve elastic member 330 applies an elastic force to the valve disc 310 so that the valve disc 310 comes into contact with the lower end of the sleeve portion 270A.

The movable member 340 is an annular member disposed around the valve shaft 280. The movable member 340 is conductive. The movable member 340 is disposed inside the sleeve portion 270A in the radial direction. The movable member 340 is disposed below the bridge portion 270C. In the present embodiment, the movable member 340 is disposed around the first valve insulating member 300A below the bridge portion 270C. The movable member 340 and the valve shaft 280 are insulated from each other by the first valve insulating member 300A. The movable member 340 is movable in the up-down direction with respect to the first valve insulating member 300A. The moving direction of the valve disc 310 and the moving direction of the movable member 340 are the same.

The first valve insulating member 300A includes a stopper portion 300C disposed below the movable member 340. The stopper portion 300C protrudes outward in the radial direction from the lower end of the first valve insulating member 300A. The stopper portion 300C has an annular shape. An outer diameter of the stopper portion 300C is larger than an inner diameter of the movable member 340. The stopper portion 300C restricts the movement of the movable member 340. With the lower surface of the movable member 340 coming into contact with the upper surface of the stopper portion 300C, the movement of the movable member 340 beyond the lower end of the first valve insulating member 300A is suppressed. That is, the stopper portion 300C suppress removal of the movable member 340 downward from the lower end of the first valve insulating member 300A is suppressed.

The valve disc 310 has an accommodation hole 310B capable of accommodating the stopper portion 300C. The accommodation hole 310B is provided above the slide hole 310A. The inner diameter of the accommodation hole 310B is larger than the inner diameter of the slide hole 310A. The lower end of the accommodation hole 310B and the upper end of the slide hole 310A are connected to each other. An upper end of the accommodation hole 310B is open. The opening of the upper end of the accommodation hole 310B is provided at the central portion of the upper surface of the valve disc 310.

The stopper portion 300C is accommodated in the accommodation hole 310B through the opening of the upper end of the accommodation hole 310B. In the up-down direction, the dimension of the stopper portion 300C is smaller than the dimension of the accommodation hole 310B. The outer diameter of the movable member 340 is larger than the inner diameter of the accommodation hole 310B. The stopper portion 300C is accommodated in the accommodation hole 310B to allow the upper surface of the stopper portion 300C to be disposed below the upper surface of the valve disc 310. In a state where the stopper portion 300C is accommodated in the accommodation hole 310B, the lower surface of the movable member 340 comes into contact with the upper surface of the valve disc 310.

The disc elastic member 350 generates an elastic force to bring the movable member 340 into contact with the valve disc 310. The disc elastic member 350 is disposed below the bridge portion 270C. The disc elastic member 350 is disposed above the movable member 340. The disc elastic member 350 is a compression coil spring disposed around the first valve insulating member 300A between the bridge portion 270C and the movable member 340. The upper end of the disc elastic member 350 is connected to the lower surface of the bridge portion 270C. The lower end of the disc elastic member 350 is connected to the upper surface of the movable member 340. The disc elastic member 350 applies an elastic force to the movable member 340 to allow the movable member 340 to move downward. The lower surface of the movable member 340 is pressed against the upper surface of the valve disc 31 by the elastic force of the disc elastic member 350.

The disc elastic member 350 is conductive. The disc elastic member 350 is formed with a conductive material. In the present embodiment, the disc elastic member 350 is formed with metal. Examples of the metal forming the disc elastic member 350 include iron and steel.

The movable member 340 is connected to the bridge portion 270C of the valve body 270 via the disc elastic member 350.

<Operation of Movable Member>

FIG. 12 is a diagram illustrating operations of the valve disc 310 and the movable member 340 according to the present embodiment. As illustrated in FIG. 12, based on the differential pressure between the inflow portion 8A and the outflow portion 8B, the valve disc 310 changes from the closed state in contact with the valve body 270 to the open state of being separated from the valve body 270 through the transition state where being slightly separated from the valve body 270. In the closed state, the valve disc 310 is disposed at a closed position P10 in contact with the valve body 270. In the open state, the valve disc 310 is disposed at an open position P30 below the closed position P10. In the transition state, the valve disc 310 is placed at a transition position P20 between the closed position P10 and the open position P30.

In the closed state where the valve disc 310 is in contact with the valve body 270, the lower surface of the movable member 340 comes into contact with the upper surface of the valve disc 310. The lower surface of the movable member 340 is pressed against the upper surface of the valve disc 310 by the elastic force of the disc elastic member 350. In the closed state of the valve disc 310, the stopper portion 300C is accommodated in the accommodation hole 310B. In the closed state of the valve disc 310, the upper surface of the stopper portion 300C is disposed below the upper surface of the valve disc 310. In the closed state of the valve disc 310, a gap is formed between the lower surface of the movable member 340 and the upper surface of the stopper portion 300C. When the valve disc 310 is disposed at the closed position P10, the movable member 340 is disposed at the upper end position P40 where the lower surface of the movable member 340 and the upper surface of the valve disc 310 are in contact with each other and a gap is formed between the lower surface of the movable member 340 and the upper surface of the stopper portion 300C.

Even in the transition state where the valve disc 310 is slightly separated from the valve body 270, the lower surface of the movable member 340 comes into contact with the upper surface of the valve disc 310. When the valve disc 310 moves downward to change from the closed state to the transition state, the movable member 340, together with the valve disc 310, moves to a position below the first valve insulating member 300A. The lower surface of the movable member 340 is pressed against the upper surface of the valve disc 310 by the elastic force of the disc elastic member 350. When the valve disc 310 is in the transition state, the lower surface of the movable member 340 comes into contact with the upper surface of the stopper portion 300C. When the valve disc 310 is disposed at the transition position P20, the movable member 340 is disposed at a lower end position P50 where the lower surface of the movable member 340 and the upper surface of the valve disc 31 are in contact with each other and the lower surface of the movable member 340 and the upper surface of the stopper portion 300C are in contact with each other.

The movable range of the valve disc 310 is a range between the closed position P10 and the open position P30. The movable range of the movable member 340 is a range between the upper end position P40 and the lower end position P50. The movable range of the valve disc 310 is larger than the movable range of the movable member 340.

In the open state where the valve disc 310 is separated from the valve body 270, the movable member 340 is separated from the valve disc 310. That is, with the movement of the valve disc 310 from the transition position P20 to the open position P30 in a state where the lower surface of the movable member 340 and the upper surface of the stopper portion 300C are in contact with each other, the lower surface of the movable member 340 is separated from the upper surface of the valve disc 310.

As described above, also in the present embodiment, when the valve disc 310 in contact with the valve body 270 moves to be separated from the valve body 270, the movable member 340 changes from the state of being in contact with the valve disc 310 to the state of being separated from the valve disc 310. The movable member 340 is in contact with the valve disc 310 in a closed state where the valve disc 310 is in contact with the valve body 270; the member is separated from the valve disc 310 after a transition state where the valve disc 310 is separated from the valve body 270.

In the closed state where the valve disc 310 is in contact with the valve body 270, the current supplied to the valve shaft 280 flows through the valve disc 310 and then flows through the valve body 270 as indicated by arrow Fb in FIG. 12. The current flowing through the valve body 270 flows through the case elastic member 16 and then flows through the lid 26.

In the transition state where the valve disc 310 is separated from the valve body 270 and the movable member 340 is in contact with the valve disc 310, as indicated by arrow Fb in FIG. 12, the current supplied to the valve shaft 280 flows through the valve disc 310 and then flows through the movable member 340. The movable member 340 is connected to the valve body 27 via the disc elastic member 350. Accordingly, the current flowing through the movable member 340 flows through the disc elastic member 350 and then flows through the valve body 270. The current flowing through the valve body 270 flows through the case elastic member 16 and then flows through the lid 26.

In the open state where the valve disc 310 is separated from the valve body 270 and the movable member 340 is separated from the valve disc 310, the current supplied to the valve shaft 280 is interrupted at the valve disc 310 as indicated by arrow Fb in FIG. 12.

<Effects>

As described above, also in the present embodiment, when the valve disc 31 changes from the closed state to the open state, the movable member 340 suppresses occurrence of electric discharge in the hydraulic oil between the valve disc 310 and the valve body 270. This suppresses the occurrence of a contact failure between the valve disc 310 and the valve body 270. This makes it possible for the controller 10 to accurately detect opening and closing of the bypass passage 12.

In the present embodiment, the movable member 340 is disposed around the valve shaft 280. This suppresses enlargement of the bypass valve 90.

The first valve insulating member 300A is disposed around the valve shaft 280. The movable member 340 is disposed around the first valve insulating member 300A. The movable member 340 and the valve shaft 280 are insulated from each other by the first valve insulating member 300A. The movable member 340 and the valve body 270 are connected to each other via the conductive disc elastic member 350. The current flowing through the movable member 340 can flow through the valve body 270 after flowing through the disc elastic member 350.

The first valve insulating member 300A includes the stopper portion 300C that restricts the movement of the movable member 340. The stopper portion 300C is disposed below the movable member 340. The stopper portion 300C restricts the movable member 340 from moving below the stopper portion 300C when the valve disc 310 moves from the transition position P20 to the open position P30.

REFERENCE SIGNS LIST

1 HYDRAULIC SYSTEM
2 HYDRAULIC OIL TANK
3 HYDRAULIC PUMP
3A SUCTION PORT
3B DISCHARGE PORT
4 OPERATION VALVE
5 HYDRAULIC ACTUATOR
6 OIL FILTER DEVICE
7 FILTER CASE
7A INLET
7B OUTLET
8 FILTER ELEMENT
8A INFLOW PORTION
8B OUTFLOW PORTION
8C OUTER SURFACE
8D INNER SURFACE
9 BYPASS VALVE
9A INFLOW PORT
9B OUTFLOW PORT
10 CONTROLLER
11 MAIN PASSAGE
12 BYPASS PASSAGE
13 INPUT LINE
14 OUTPUT LINE
15 STRAINER
15A STRAINER BODY
15B FLANGE PORTION
16 CASE ELASTIC MEMBER
17 INPUT MEMBER
17A SHAFT PORTION
17B PLATE PORTION
18 FIXING MEMBER
19 CASE INSULATING MEMBER
19A FIRST CASE INSULATING MEMBER
19B SECOND CASE INSULATING MEMBER
19C THIRD CASE INSULATING MEMBER
20 SEAL MEMBER
21 RELAY ELASTIC MEMBER
22 RELAY MEMBER
22A BASE
22B PROTRUSION
22C SUPPORT SURFACE
23 LEAD WIRE
24 COVER
24A HOLE
25 CASE BODY
25A CIRCUMFERENTIAL WALL
25B BOTTOM PLATE
25C CASE OPENING
26 LID
26A UPPER SURFACE
26B LOWER SURFACE
26C THROUGH HOLE
27 VALVE BODY
27A SLEEVE PORTION
27B FLANGE PORTION
27C BRIDGE PORTION
27D INLET
27E OUTLET
27F GUIDE HOLE
27G ACCOMMODATION HOLE
27H STEPPED SURFACE
27I RECESS
28 VALVE SHAFT
29 POSITIONING MEMBER
30 VALVE INSULATING MEMBER
30A FIRST VALVE INSULATING MEMBER
30B SECOND VALVE INSULATING MEMBER
31 VALVE DISC
31A SLIDE HOLE
32 SUPPORT MEMBER
33 VALVE ELASTIC MEMBER
34 MOVABLE MEMBER
34A PIN PORTION
34B FLANGE PORTION
35 DISC ELASTIC MEMBER
36 SCREW
37 SUPPORT PLATE
37A PERIPHERAL EDGE
38 SCREW
39 SCREW
40 INSULATING FILM
41 GROUND LINE
42 GROUND PART
90 BYPASS VALVE
270 VALVE BODY
270A SLEEVE PORTION
270C BRIDGE PORTION
280 VALVE SHAFT
290 POSITIONING MEMBER
300 VALVE INSULATING MEMBER
300A FIRST VALVE INSULATING MEMBER
300B SECOND VALVE INSULATING MEMBER
300C STOPPER PORTION
310 VALVE DISC
310A SLIDE HOLE
310B ACCOMMODATION HOLE
320 SUPPORT PORTION
330 VALVE ELASTIC MEMBER
340 MOVABLE MEMBER
350 DISC ELASTIC MEMBER
AX CENTRAL AXIS
P1 CLOSED POSITION
P2 TRANSITION POSITION
P3 OPEN POSITION
P4 UPPER END POSITION
P5 LOWER END POSITION
P10 CLOSED POSITION
P20 TRANSITION POSITION
P30 OPEN POSITION
P40 UPPER END POSITION
P50 LOWER END POSITION

The invention claimed is:

1. An oil filter device comprising:
a filter case;
a filter element disposed in a main passage provided in an internal space of the filter case;
a valve body having conductivity and disposed in a bypass passage provided in the internal space;
a valve shaft having conductivity and supported by the valve body via a valve insulating member;
a valve disc having conductivity and movably supported by the valve shaft and configured to close the bypass passage by coming in contact with the valve body;

a valve elastic member that generates an elastic force to bring the valve disc into contact with the valve body;

a movable member having conductivity, connected to the valve body, configured to come into contact with the valve disc in a state where the valve disc comes into contact with the valve body and configured to separate from the valve disc after the valve disc separates from the valve body; and a controller that supplies current to the valve disc via the valve shaft to determine whether the bypass passage is closed based on an energization state across the valve disc and the valve body.

2. The oil filter device according to claim 1, wherein the filter element includes an inflow portion of hydraulic oil and an outflow portion of the hydraulic oil, the valve disc moves to be separated from the valve body when a differential pressure indicating a difference between a pressure at the inflow portion and a pressure at the outflow portion exceeds a specified value, and the movable member changes from a state of being in contact with the valve disc to a state of being separated from the valve disc when the valve disc moves to be separated from the valve body.

3. The oil filter device according to claim 1, wherein a movable range of the valve disc is larger than a movable range of the movable member.

4. The oil filter device according to claim 1, wherein a moving direction of the valve disc and a moving direction of the movable member are the same.

5. The oil filter device according to claim 1, wherein the valve disc is disposed below the valve body, and the movable member is disposed above the valve disc.

6. The oil filter device according to claim 1, wherein the valve body includes a sleeve portion, the valve disc is disposed below the sleeve portion and comes into contact with a lower end of the sleeve portion to close the bypass passage, and the movable member is disposed inside the sleeve portion.

7. The oil filter device according to claim 1, wherein the movable member is disposed next to the valve shaft.

8. The oil filter device according to claim 7, wherein at least a part of the movable member comes into contact with the valve body.

9. The oil filter device according to claim 7, comprising a disc elastic member that generates an elastic force to bring the movable member into contact with the valve disc.

10. The oil filter device according to claim 1, wherein the movable member is disposed around the valve shaft.

11. The oil filter device according to claim 10, wherein the valve insulating member is disposed around the valve shaft, the movable member is disposed around the valve insulating member and connected to the valve body via a disc elastic member having conductivity, and the disc elastic member generates an elastic force to bring the movable member into contact with the valve disc.

12. The oil filter device according to claim 11, wherein the valve insulating member includes a stopper portion disposed below the movable member and configured to restrict a movement of the movable member.

13. The oil filter device according to claim 1, wherein the filter case includes a case body and a lid having conductivity, the lid configured to cover a case opening provided in the case body, the oil filter device comprises a case elastic member having conductivity and disposed between the lid and the valve body, and in a state where the valve disc is in contact with the valve body, the current supplied to the valve disc flows through the lid.

* * * * *